(12) United States Patent
Ozkan et al.

(10) Patent No.: US 11,056,288 B2
(45) Date of Patent: Jul. 6, 2021

(54) NANODENDRITE WITH RUTHENIUM OXIDE CAPACITOR AND METHOD

(71) Applicant: The Regents of the University of California, Oakland, CA (US)

(72) Inventors: Cengiz S. Ozkan, San Diego, CA (US); Mihrimah Ozkan, San Diego, CA (US); Chueh Liu, Dayton, OH (US); Changling Li, Riverside, CA (US); Wei Wang, Newport Beach, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 440 days.

(21) Appl. No.: 16/063,130

(22) PCT Filed: Dec. 15, 2016

(86) PCT No.: PCT/US2016/067016
§ 371 (c)(1),
(2) Date: Jun. 15, 2018

(87) PCT Pub. No.: WO2017/106553
PCT Pub. Date: Jun. 22, 2017

(65) Prior Publication Data
US 2020/0273633 A1    Aug. 27, 2020

Related U.S. Application Data

(60) Provisional application No. 62/267,718, filed on Dec. 15, 2015.

(51) Int. Cl.
| | |
|---|---|
| *H01G 11/26* | (2013.01) |
| *C23F 1/02* | (2006.01) |
| *H01G 11/46* | (2013.01) |
| *H01G 11/86* | (2013.01) |

(52) U.S. Cl.
CPC ............... *H01G 11/26* (2013.01); *C23F 1/02* (2013.01); *H01G 11/46* (2013.01); *H01G 11/86* (2013.01)

(58) Field of Classification Search
None
See application file for complete search history.

(56) References Cited

U.S. PATENT DOCUMENTS

| | | |
|---|---|---|
| 4,435,252 A | 3/1984 | Kadija |
| 7,640,789 B2 | 1/2010 | Kim et al. |
| 7,858,213 B2 | 12/2010 | Tsai et al. |
| 7,884,044 B2 | 2/2011 | Difranco et al. |
| 8,411,411 B2 * | 4/2013 | Oikawa ............. H01G 4/008 361/306.1 |
| 8,426,067 B2 | 4/2013 | Tsukada et al. |

(Continued)

OTHER PUBLICATIONS

International Application Serial No. PCT/US2016/067016, International Search Report and Written Opinion dated Mar. 2, 2017, 6 pgs.

(Continued)

*Primary Examiner* — Dion Ferguson
(74) *Attorney, Agent, or Firm* — Schwegman Lundberg & Woessner, P.A.

(57) ABSTRACT

A metallic nanodendrite electrode and methods are shown. In one example, the metallic nanodendrite is coated with ruthenium oxide and is used as an electrode in a capacitor.

9 Claims, 22 Drawing Sheets

(56) References Cited

U.S. PATENT DOCUMENTS

| | | | |
|---|---|---|---|
| 2010/0210453 A1* | 8/2010 | Hu | H01M 4/8605 |
| | | | 502/184 |
| 2011/0235240 A1* | 9/2011 | Lu | H01G 11/46 |
| | | | 361/502 |
| 2015/0259811 A1 | 9/2015 | Takeuchi | |
| 2016/0268061 A1* | 9/2016 | Wang | C01B 32/16 |
| 2017/0062143 A1* | 3/2017 | Zhamu | H01G 11/28 |
| 2017/0148573 A1* | 5/2017 | Zhamu | H01G 11/46 |
| 2018/0233297 A1* | 8/2018 | Zhamu | H01G 11/84 |
| 2018/0301690 A1* | 10/2018 | Ozkan | H01M 4/131 |

OTHER PUBLICATIONS

"International Application Serial No. PCT US2016 067016, International Preliminary Report on Patentability dated Jun. 28, 2018", 6 pgs.

* cited by examiner

| | ESR ($\Omega$) | $R_{CT}$ ($\Omega$) | $R_L$ ($\Omega$) | $CPE_{DL}$ Q | n | $CPE_P$ Q | n | $W_o$ $W_{or}$ | $W_{oc}$ |
|---|---|---|---|---|---|---|---|---|---|
| $0^{th}$ | 0.665 | 0.15 | 300 | 0.025 | 0.65 | 0.068 | 0.75 | 2 | 0.3 |
| $10000^{th}$ | 0.515 | 0.18 | 120 | 0.04 | 0.62 | 0.039 | 0.83 | 2 | 0.3 | ns
NANODENDRITE WITH RUTHENIUM OXIDE CAPACITOR AND METHOD

CLAIM OF PRIORITY

This application is a U.S. National Stage Filing under 35 U.S.C. 371 from International Application No. PCT/US2016/067016, filed on Dec. 15, 2016, and published as WO 2017/106553 A1 on Jun. 22, 2017, which claims the benefit of priority to U.S. Provisional Patent Application No. 62/267,718, filed on Dec. 15, 2015, each of which is hereby incorporated by reference herein in its entirety.

TECHNICAL FIELD

This invention relates to high surface area microstructured materials and methods. In one example, this invention relates to nickel based electrodes for capacitors.

BACKGROUND

Improved electronic devices, such as capacitors are desired. high energy density and low cost are two characteristics that are desired in improved capacitors.

DETAILED DESCRIPTION

Figure 1A:
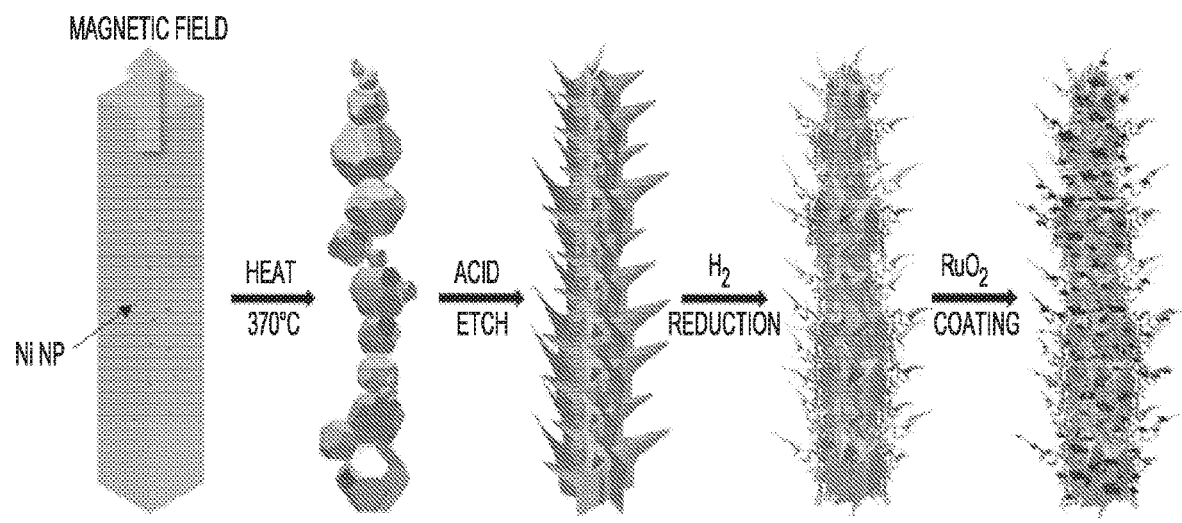
FIG. 1a shows selected steps in a method of manufacture of a metal oxide nanofiber according to an example of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

Herein, Ni nanodendrite (ND) with diameter ca. 30-100 nm directly synthesized on Ni foam is utilized as an effective support for hydrous $RuO_2$ in symmetric supercapacitors operated at 1.6 V. Highest specific capacitance 678.57 F $g^{-1}$ can be achieved with energy density 60.32 Wh $kg^{-1}$. Even at large current density 100 A $g^{-1}$, high energy density 19.73 Wh $kg^{-1}$ can still be maintained with power density 40 kW $kg^{-1}$ owing to the pristine metal nanostructure without any carbon additive and resistive binder. Long lifespan is shown with marginal performance improvement (ca. 4%) over 10000 cycles. More importantly, the template-less and self-assembled Ni ND synthesis requires only low temperature and eco-friendly chemicals, and can be simply dip-coated with $RuO_2$ nanoparticles. All of these render the $RuO_2$—Ni ND foam readily adapted into mass manufacturing without efforts.

In the new millennium, oil crisis and acute climate change are relentlessly challenging modern society. To reduce the dependence on fossil fuels and diminish greenhouse gas emission, it is indispensable to future human civilization to deliver energy in efficient ways and harness energy from renewable sources. However, high power requirement is often demanded due to the intermittent nature of these sources, such as unstable tidal and wind flow, and in regenerative recharge from braking in electric vehicles. In this case, supercapacitors with higher power density than Li-ion batteries, and higher energy density than traditional capacitors will play important roles in these fields. Nonetheless, electric double-layer capacitors (EDLCs) storing energy by electrostatic charges still fail to meet the requirement because of its lower energy density. Pseudocapacitors take advantage of fast and reversible surface redox reactions to provide 10-100 times higher energy density than EDLCs. Traditional pseudocapacitor materials include conducting polymers, e.g. polyaniline (PANI), polypyrrol (PPy) and polythiophene (PTh), and transition metal oxides, such as $MnO_2$, $TiO_2$, $MoO_3$, NiO, $Ni(OH)_2$, and $RuO_2$.

Although conducting polymer is relatively cheap, it still suffers from strict operating potential window, mechanical degradation and short cycle life. Among metal oxides, $RuO_2$, especially hydrous and amorphous $RuO_2$ exhibits superior performance resulting from its high theoretical specific capacitance (1450 F $g^{-1}$ of $RuO_2$ and 1360 F $g^{-1}$ of $RuO_2.0.5H_2O$ over 1 V window), metallic electrical conductivity, and fast proton transport through the structural water. Nevertheless, scarcity and high price of ruthenium prevent it from large scale production. Efforts have been made to minimize $RuO_2$ loading by anchoring it onto nanostructures. Nanoporous gold electroplated with $RuO_2$ demonstrates specific capacitances (1150-1450 F g$^{-1}$) very close to theoretical value. However, extremely low $RuO_2$ loading (2 to 16 μg cm$^{-2}$) and expensive gold substrate prohibit it from practical utilization. Hydrous $RuO_2$ anchored on graphene sheet composite (ROGSC) shows stable specific capacitance (300-570 F g$^{-1}$) for 1000 cycles. Nonetheless, relative low Ru content (38.3 wt %) on ROGSC, the necessity of conductive carbon black and polytetrafluoroethylene (PTFE) binder further reduces active material loading. $RuO_2$ nanoparticles in tetragonal phase embedded in electrospun carbon nanofibers show ca. 200 F g$^{-1}$ for 3000 cycles. However, $RuO_2$ nanoparticles embedded inside carbon nanofibers are inactive for surface redox reaction, and the crystalline nature further decrease its specific capacitance. Graphene and carbon nanotube (CNT) hybrid foam is synthesized as support for hydrous $RuO_2$ with specific capacitance of ca. 220-500 F g$^{-1}$ and is stable over 8100 cycles. Nevertheless, expensive manufacturing processes, including high vacuum e-beam evaporated Ni catalysts and high temperature graphene/CNT growth, render this support impractical for large scale production. Accordingly, cheap while effective $RuO_2$ nanostructural supports are still necessary.

Nickel is widely utilized in electrochemical devices as a result of its chemical stability, low price and high availability. Recently, commercially available Ni nanofoam consisting of interconnected Ni nanowires is decorated with $SnO_2$ by atomic layer deposition. High capacity, high rate capability and stability for Li-ion anode can be achieved with this structure. Ni nanofoam with various diameters (100-1000 nm) can be synthesized by refluxing glycerol and Ni acetate ($Ni(Ac)_2$). Ni can be further etched by oxalic acid into Ni oxalate nanowires and nanosheets to increase surface area, which can be further reduced back to Ni metal under inert or reducing atmosphere. In this work, Ni nanodendrite (ND, dia. ca. 30-100 nm) attached on Ni nanowire (ca. 300 nm in dia.) backbone is synthesized directly on Ni foam as a novel support for hydrous $RuO_2$ nanoparticles in symmetric supercapacitors. Ni nanowires are grown on HCl-treated Ni foam with $Ni(Ac)_2$ and glycerol at 370° C. Ni nanowires are transformed into leaf-like Ni oxalate nanostructures by oxalic acid treatment at 120° C. Ni oxalate nanoleaves are further reduced back to Ni ND on Ni foam (NDF) by $H_2$ at 350° C. Hydrous $RuO_2$ nanoparticles are dip-coated onto NDF and annealed at 150° C. under vacuum without any binder and conductive additive. Highest specific capacitance (678.57 F g$^{-1}$) can be achieved at 0.5 A g$^{-1}$, with energy density 60.32 Wh kg$^{-1}$. Even at large current density 100 A g$^{-1}$, specific capacitance can still be 221.95 F g$^{-1}$ with high energy density 19.73 Wh kg$^{-1}$ and power density 40 kW kg$^{-1}$. The entire NDF metal support without any conductive additive and binder renders very low equivalent series resistance (ESR) ca. 0.5Ω, leading to low resistive loss and good power performance. More importantly, Ni NDF requires only low temperature production, environmentally benign chemicals, no templates for nanostructure growth, and simple dip-coating process, which can be adapted into large scale production without efforts.

Figure 1B:
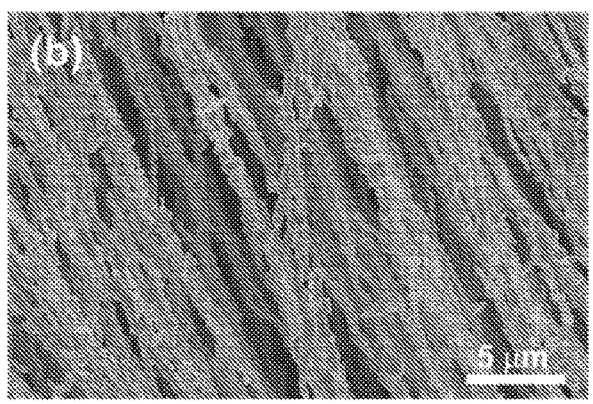
FIG. 1b-e shows selected microscopic images of a metal oxide nanofiber according to an example of the invention.
Figure 1C:
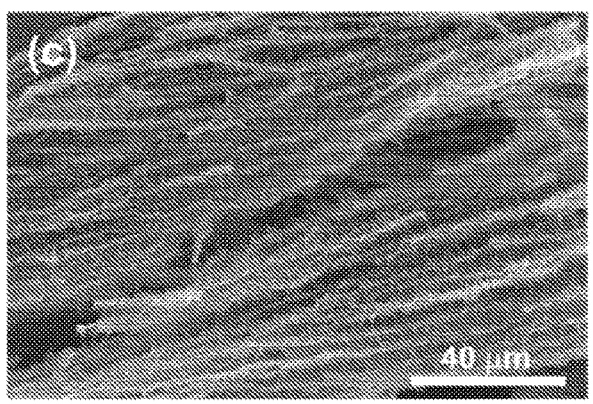
Figure 1D:
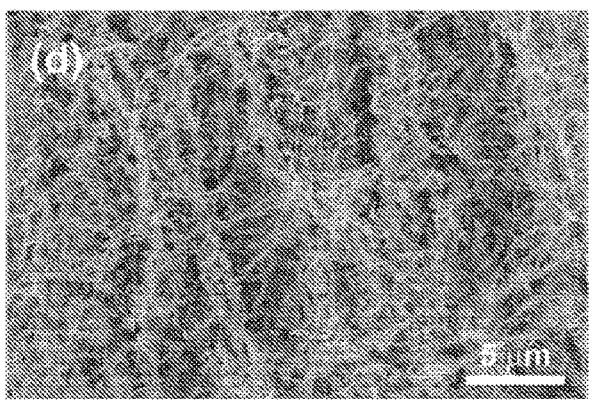
Figure 1E:
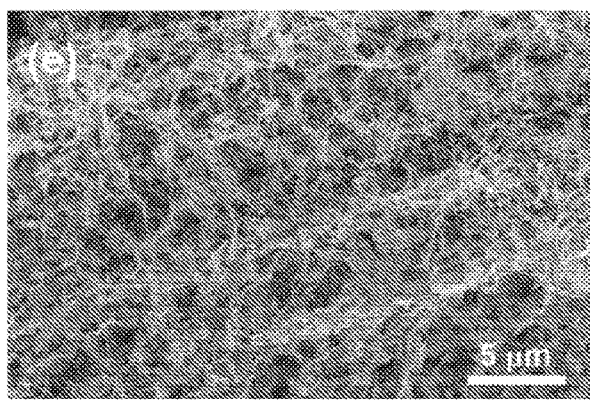
Figure 2A:
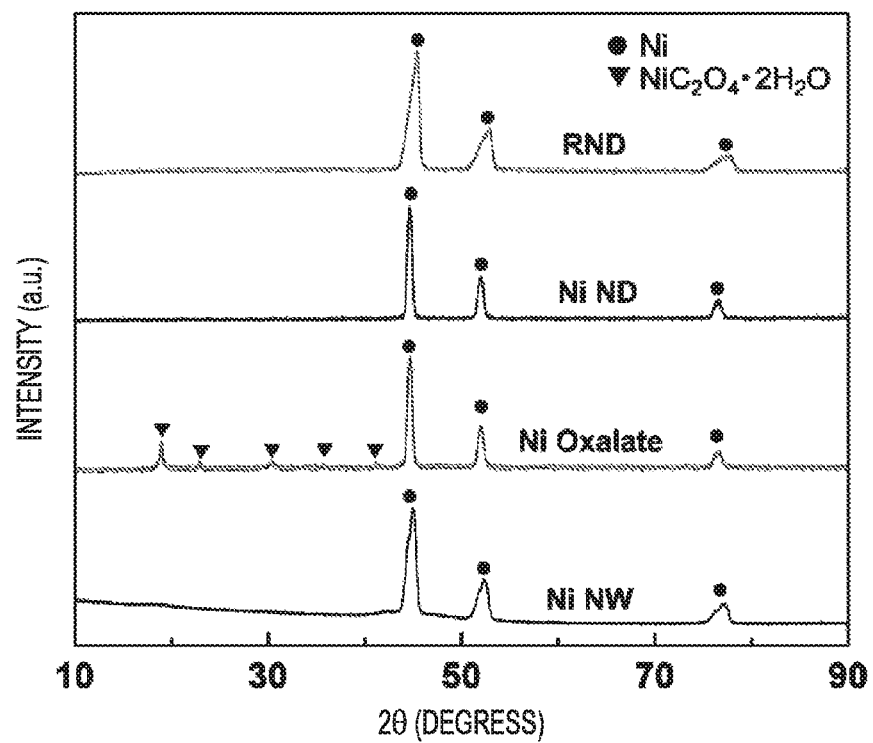
FIG. 2a-b shows x-ray diffraction data and transmission electron spectroscopy data relating to metal oxide nanofibers according to an example of the invention.
Figure 2B:
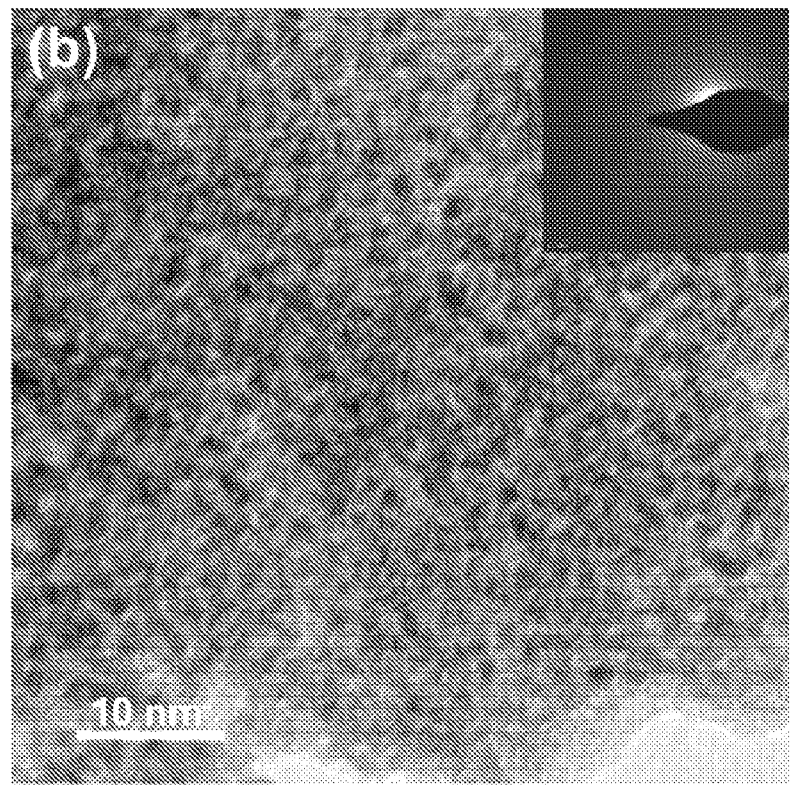

Hierarchical nanostructure of NDF can provide large surface area, short proton conduction pathways, and electrical conductive support for $RuO_2$ deposition. Schematic of synthesis and scanning electron microscopic (SEM) images of NDF are shown in FIG. 1. To synthesize NDF, HCl-treated Ni foam is heated up to 370° C. with 0.08 M $Ni(Ac)_2$/glycerol solution (FIG. 1a). Ni nanoparticles formed by reduction of $Ni^{2+}$ ions with glycerol nucleate into larger polyhedral nanoparticles, and grow into nanowires (ca. 200-700 nm in diameter) along the magnetic field provided by the magnetic stir rotor inside the hotplate (FIG. 1b). Magnetic alignment of Ni nanoparticles growing into Ni nanowires has been demonstrated in three-dimensional nonwoven clothes, which proves the feasibility of manufacturing ferromagnetic materials into self-assembled nanowires without templates. X-ray diffraction (XRD) pattern of Ni nanowires demonstrates peaks at 45.1°, 52.5° and 76.9°, which are characteristic of cubic Ni metal (ref code: 01-070-0989, FIG. 2a). Leaf-like Ni oxalate nanostructure can be obtained by etching Ni nanowires in 0.3 M oxalic acid/ethanol solution at 120° C. (FIG. 1c), which can further increase surface area of the nanowires. XRD peaks at 18.9°, 23.0°, 30.4°, 35.8°, and 41.2° indicate the existence of Ni oxalate ($NiC_2O_4 \cdot 2H_2O$, ref. code 00-014-0742). Ni oxalate can be reduced back into Ni ND by $H_2$ at 350° C. (FIG. 1d) with diameters ca. 30-100 nm, which shows only Ni metal crystalline phases without presence of Ni oxalate (FIG. 2a). Hydrous $RuO_2$ prepared by mixing $RuCl_3$ with NaOH is dipped onto NDF, and the whole electrode is annealed at 150° C. under vacuum (FIG. 1e). Loading of $RuO_2$ is measured as the weight difference of NDF before and after $RuO_2$ coating. $RuO_2$ nanoflakes can be uniformly suspended on these dendritic struts, which provides intimate contact and open space for fast electrical and ionic conduction, respectively. Energy dispersive X-ray spectroscopic (EDX) analysis and elemental mapping (FIG. 8) show uniform distribution of $RuO_2$ on NDF with a trace amount of Na ions from the reaction by-products. XRD pattern of the $RuO_2$-coated NDF shows only Ni metal phase (FIG. 2a), which indicates the hydrous $RuO_2$ is amorphous. High resolution transmission electron microscopic (HRTEM) image (FIG. 2b) of the hydrous $RuO_2$ shows that $RuO_2$ nanoparticle diameters range from 2-3 nm. Most of the nanoparticles do not demonstrate lattice fringes, and very weak diffraction rings of selected area electron diffraction pattern further confirm the amorphous nature of the hydrous $RuO_2$.

Figure 3A:
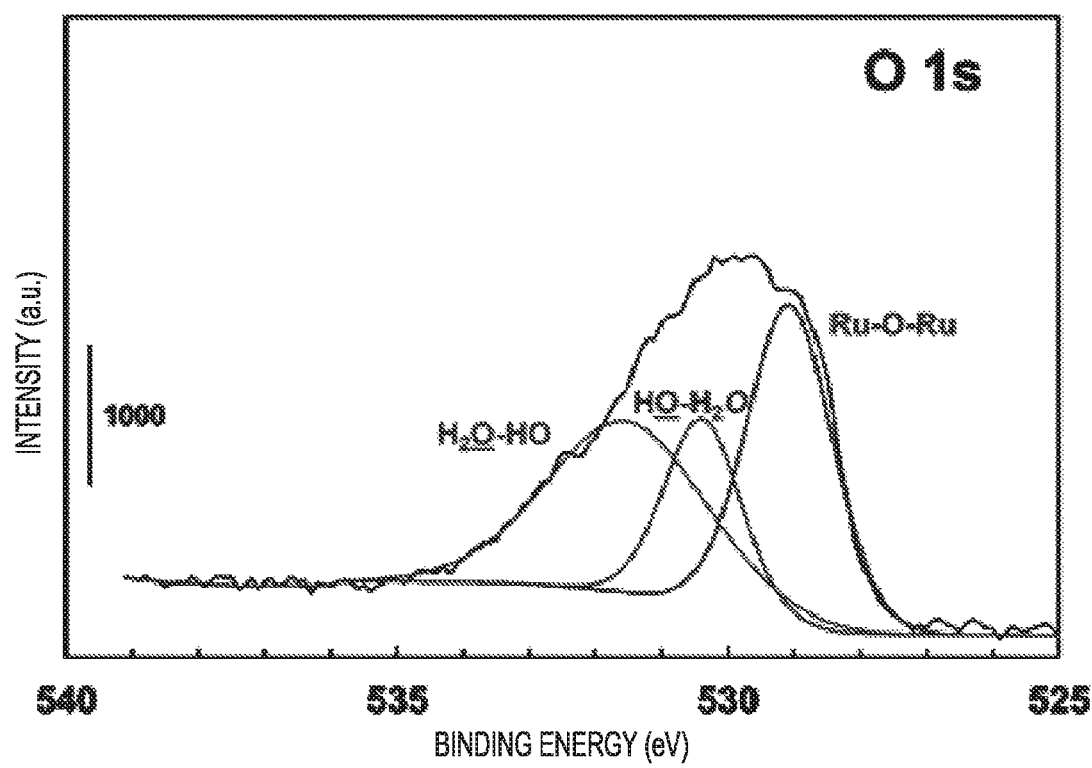
FIG. 3 shows x-ray photoelectron spectroscopy data relating to metal oxide nanofibers according to an example of the invention.
Figure 3B:
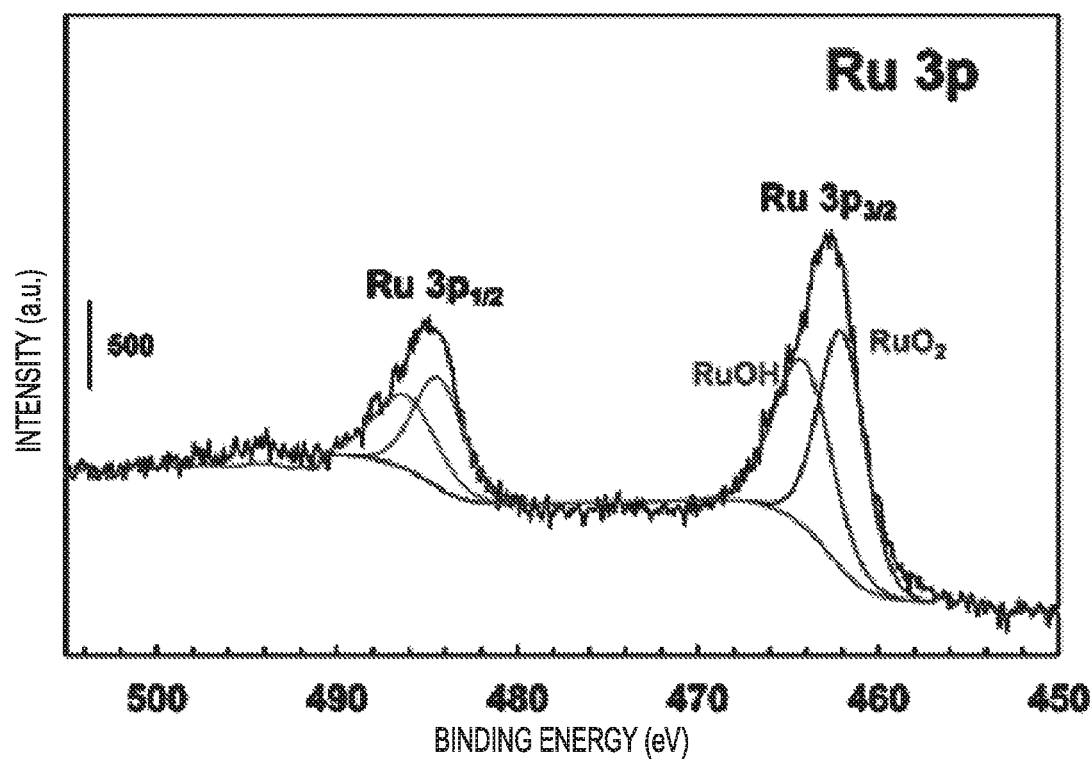
Figure 3C:
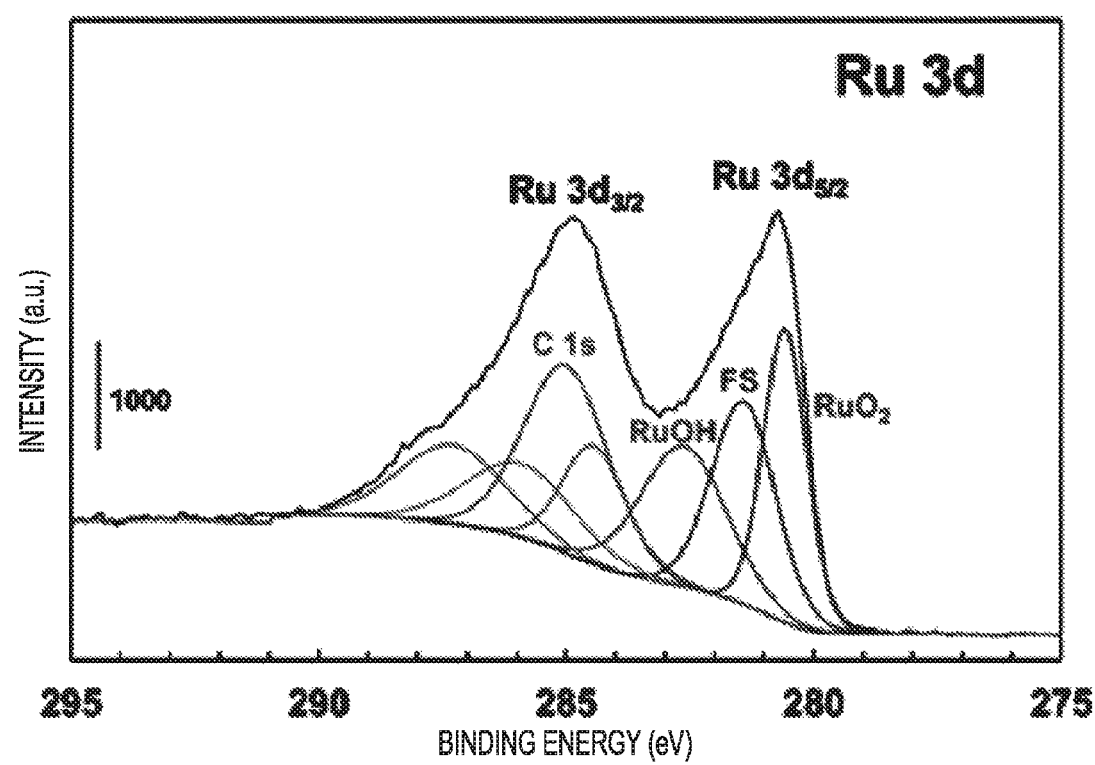
Figure 9:
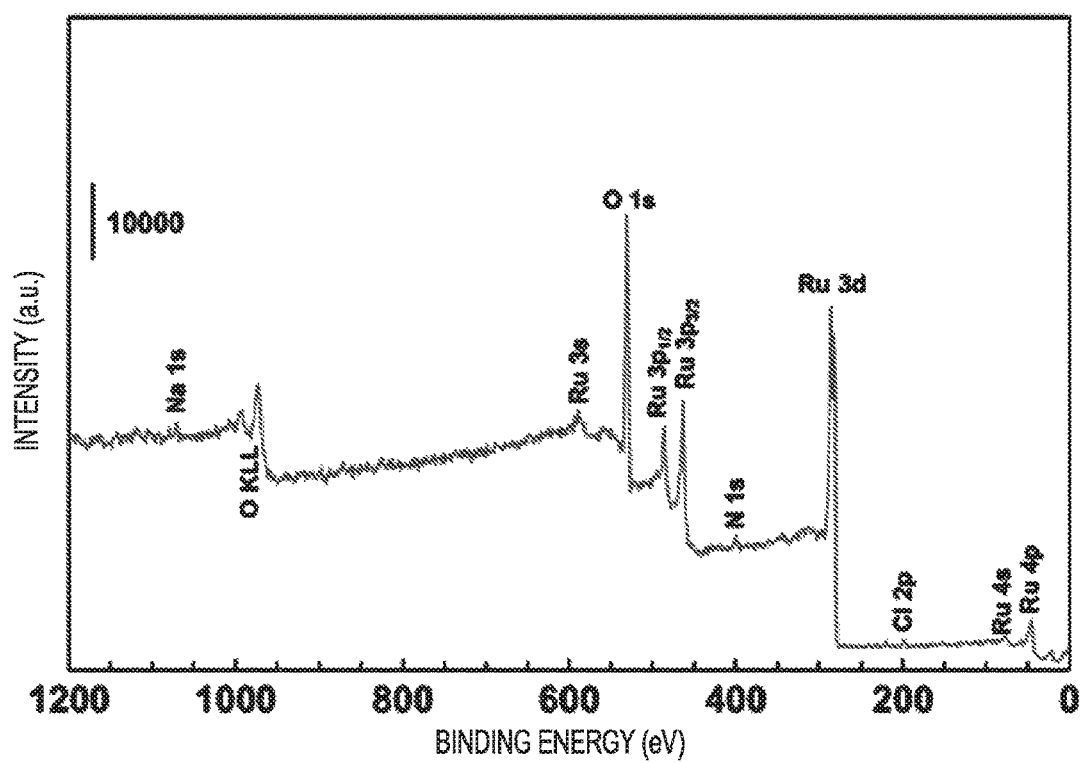
FIG. 9 shows x-ray photoelectron spectroscopy data of ruthenium oxide according to an example of the invention.

Hydrous nature of $RuO_2$ synthesized by sol-gel process and low temperature annealing is further elucidated by X-ray photoelectron spectroscopy (XPS). O 1 s peak (FIG. 3a) for Ru—O—Ru from $RuO_2$ is at 529.1 eV, while the co-adsorbed $H_2O$—OH layer with OH and $H_2O$ hydrogen bonded to each other results in peaks at 530.4 and 531.6 eV from OH (H$\underline{O}$—$H_2O$) and water ($H_2\underline{O}$—HO), respectively. Ru $3p_{3/2}$ (FIG. 3b) is deconvoluted into $RuO_2$ (462.0 eV) and RuOH (464.2 eV) signals exhibiting an intensity ratio of 1:0.9. Ru 3d (FIG. 3c) shows seven constituents including Ru $3d_{5/2}$ of $RuO_2$ at 280.6 eV, RuOH at 282.6 eV, and at 281.4 eV from final-state screening effect (FS). Binding energy is calibrated using C is peak at 285.0 eV from sample support, and the rest peaks are responsible for Ru $3d_{3/2}$. Survey spectrum is shown in FIG. 9.

Figure 10:
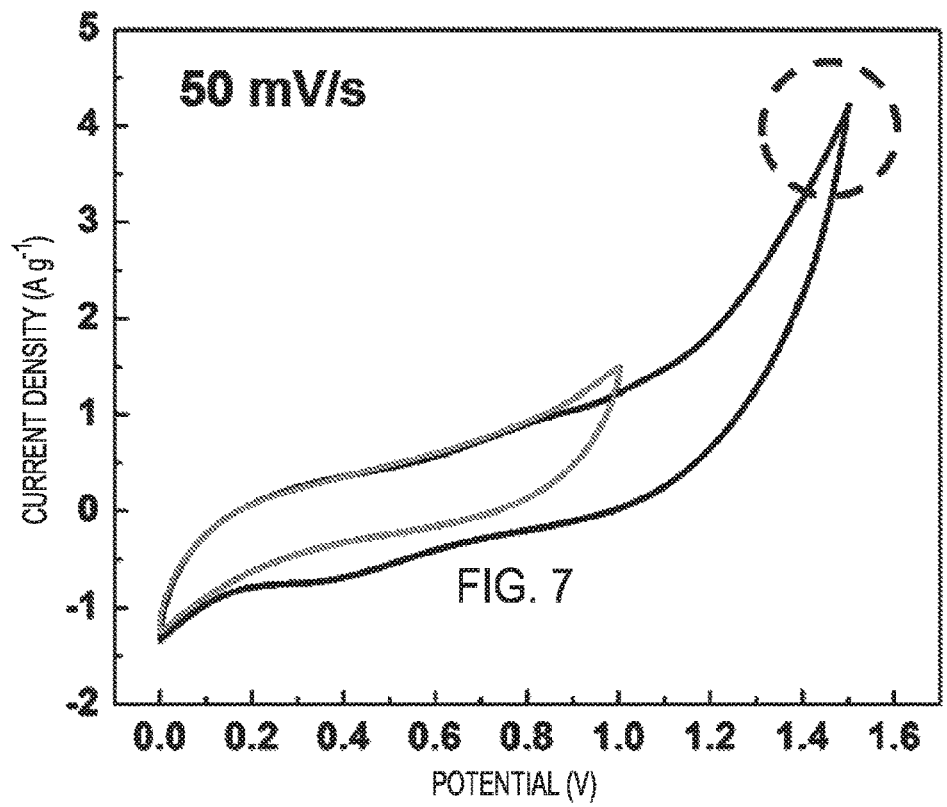
FIG. 10 shows CV data of a metal oxide nanofiber according to an example of the invention.

Electrochemical behaviors of the two-electrode symmetric supercapacitors consisting of hydrous $RuO_2$ on NDF with aqueous electrolyte (2M $Li_2SO_4$) and polymer separator (Celgard 3501) are demonstrated in FIG. 4. Cyclic voltammograms (CVs) of the electrodes with $RuO_2$ loading 0.6 mg cm$^{-2}$ are shown in FIG. 4a with scan rate from 10 to 200 mV s$^{-1}$ between 0-1.6 V The rectangular shape of the CV curves without obvious redox peaks indicates ideal capacitive behaviors even at high scan rate 200 mV s$^{-1}$, which shows superior rate capability of the $RuO_2$-NDF supercapacitors. The extended potential window to 1.6 V is higher than most aqueous electrolyte supercapacitors (ca. 1.0 V). This can be attributed to the utilization of neutral $Li_2SO_4$ aqueous electrolyte, which provides strong hydration energy of lithium cations and sulfate anions with water molecules leading to water decomposition potential higher than 1.23 V. In addition, $RuO_2$ has been shown to prohibit water decomposition in neutral $Na_2SO_4$ aqueous electrolyte, resulting in high overpotentials for both hydrogen and oxygen evolution reactions. Without $RuO_2$ coating, water is decomposed vigorously at 1.5 V with Ni NDF only (FIG. 10). Accordingly, $RuO_2$-NDF in aqueous $Li_2SO_4$ electrolyte can be operated in a wide potential window, which is beneficial to reach high specific capacitance, energy and power density.

Figure 4A:
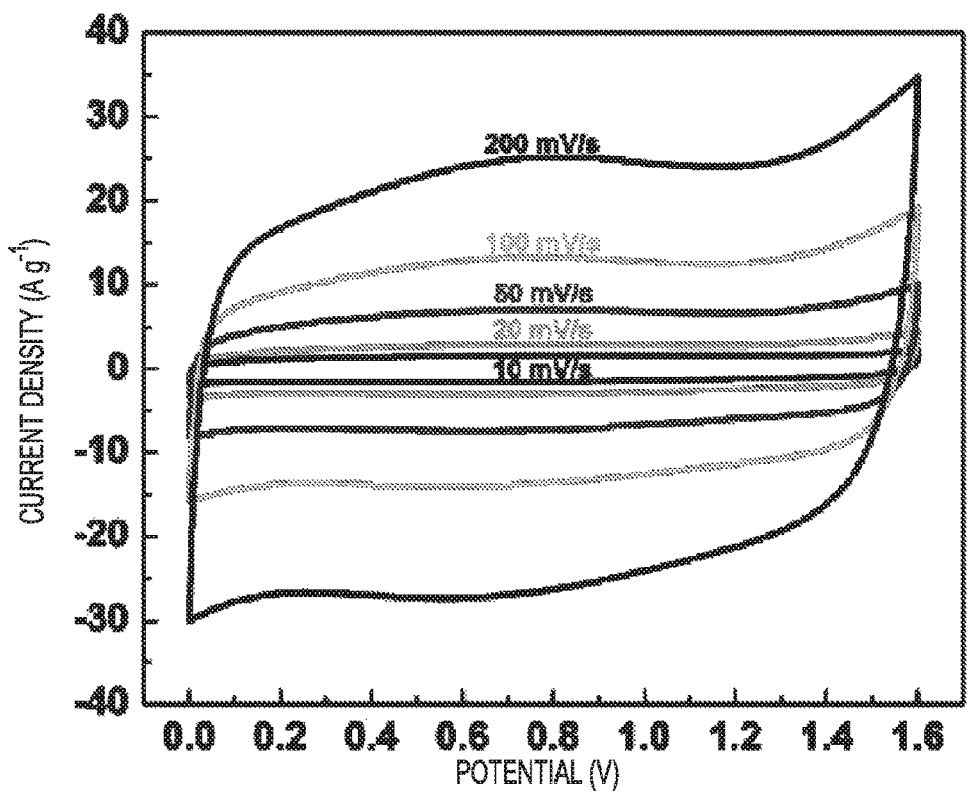
FIG. 4 shows electrochemical measurement data of a capacitor including metal oxide nanofibers according to an example of the invention.
Figure 4B:
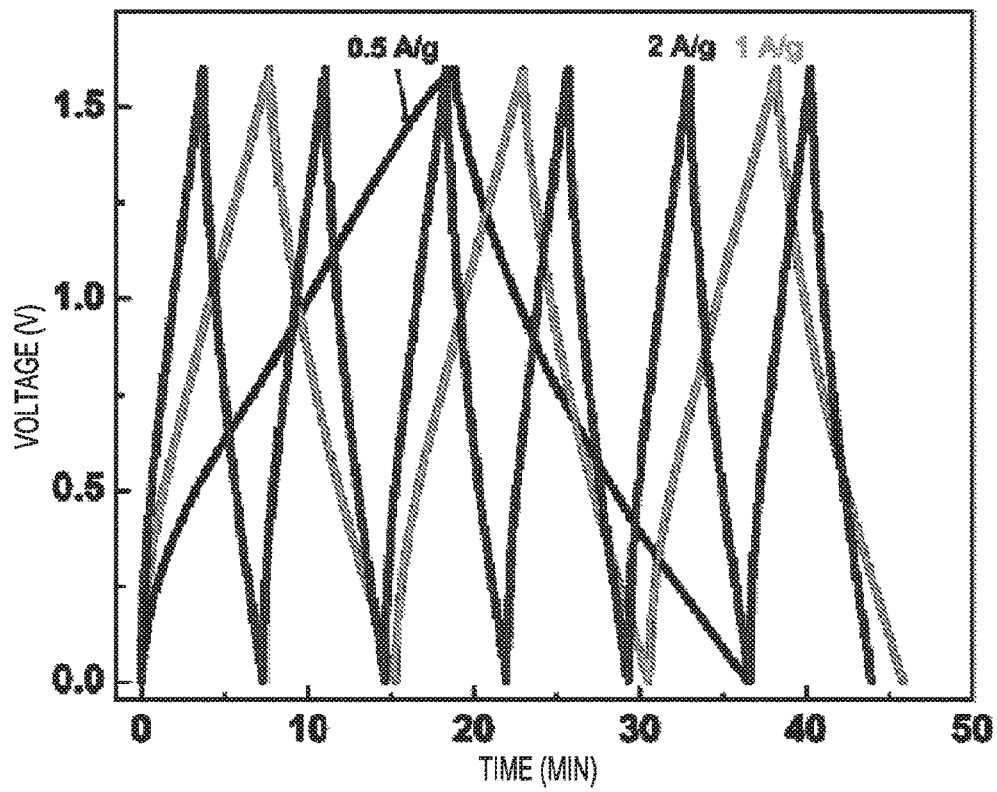
Figure 4C:
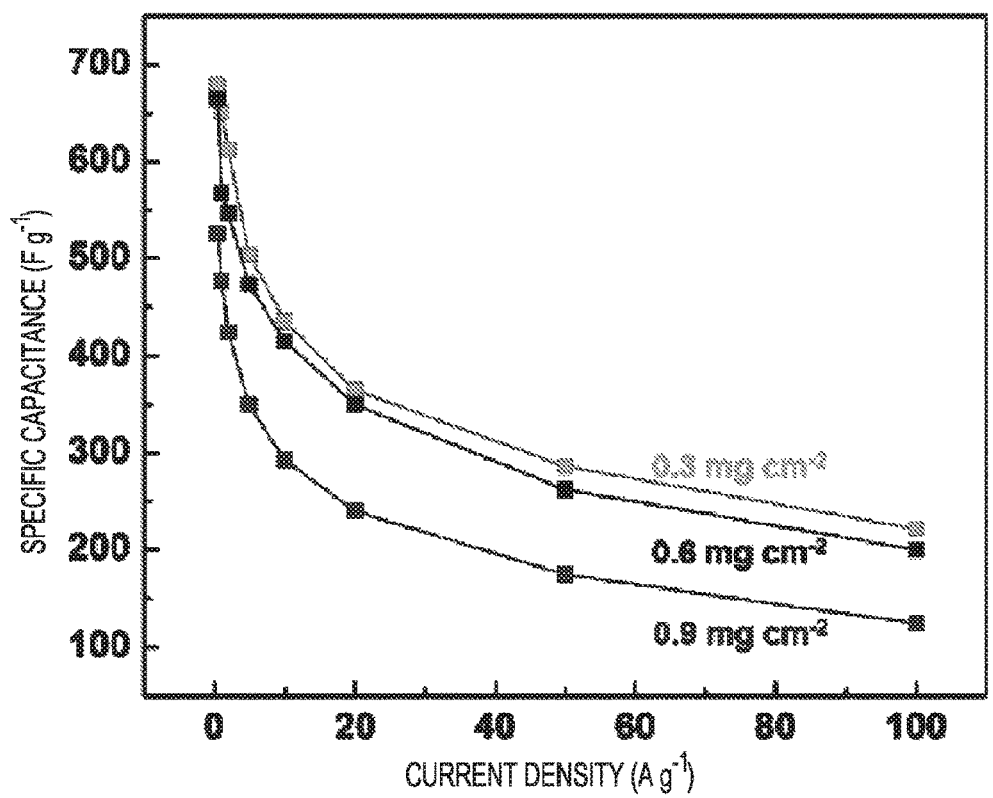
Figure 4D:
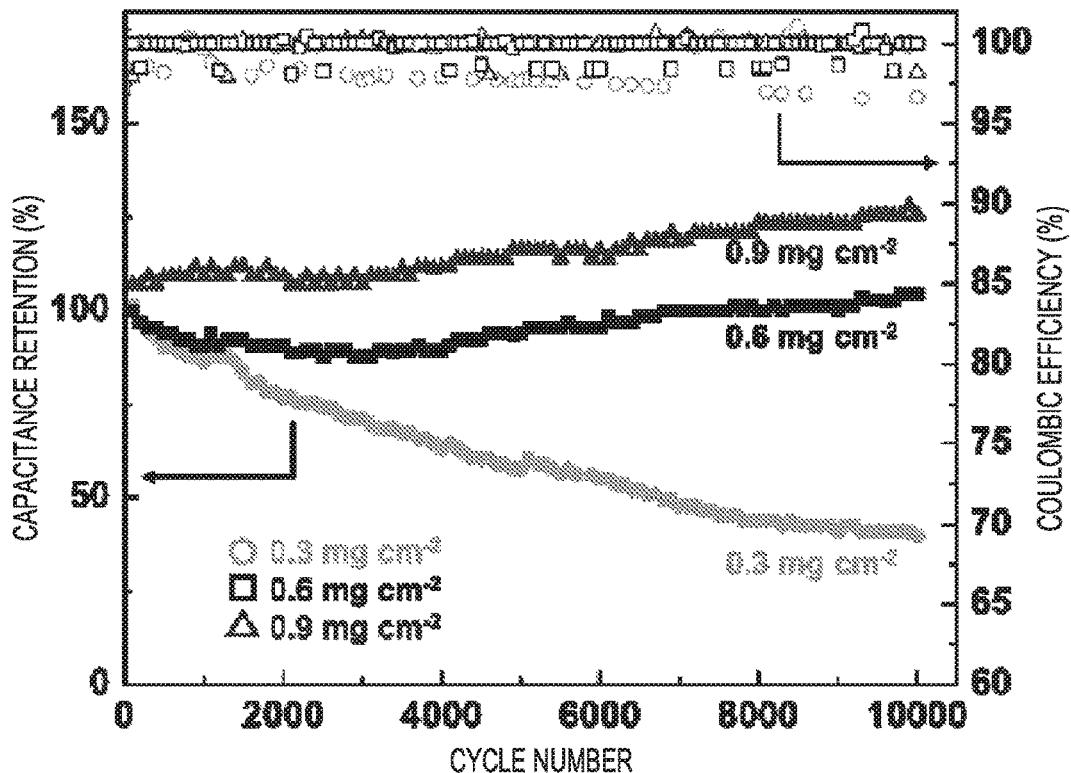
Figure 11A:
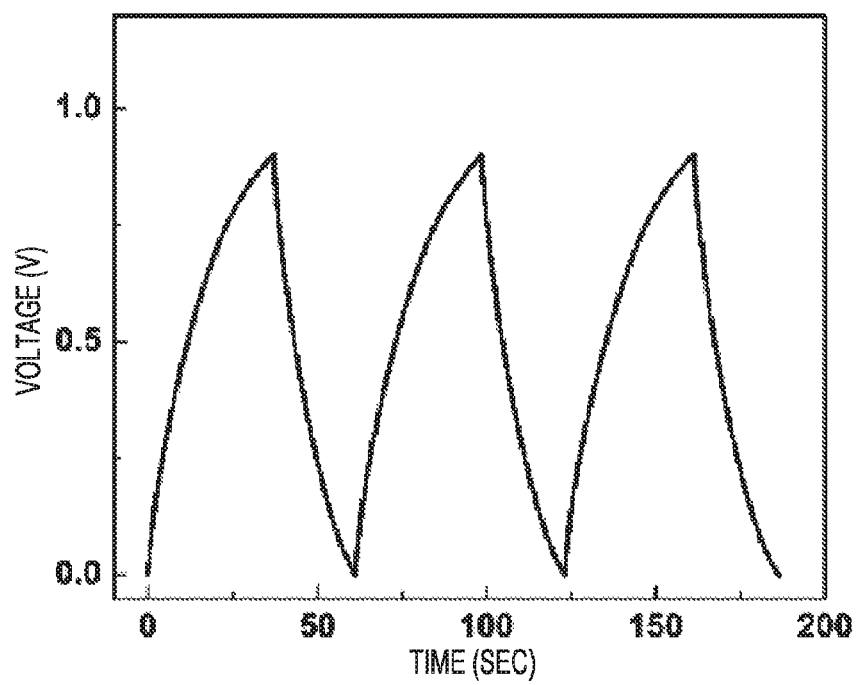
FIG. 11 shows galvanostatic charge/discharge data of a capacitor including metal oxide nanofibers according to an example of the invention.
Figure 11B:
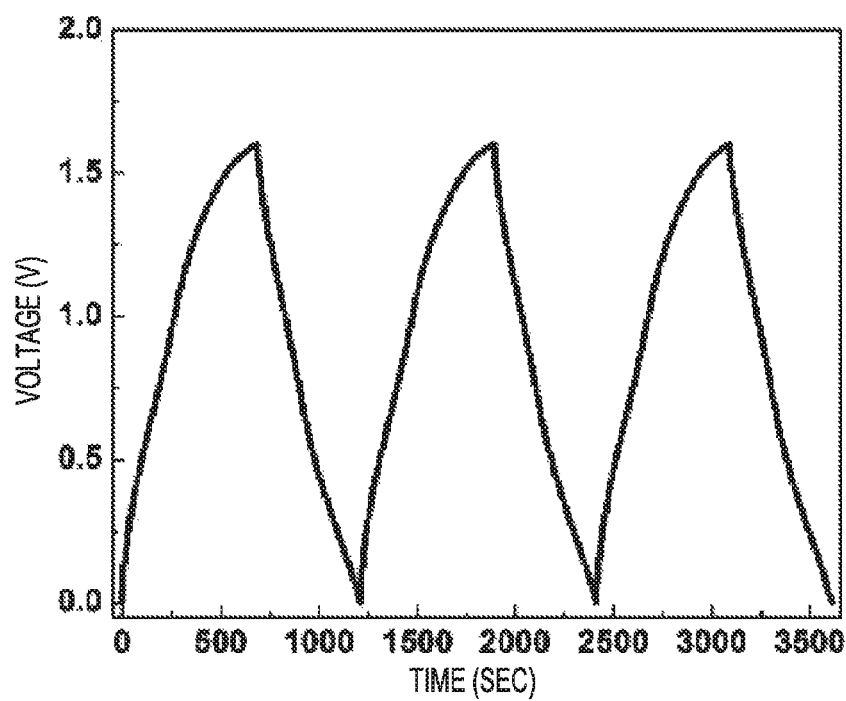
Figure 11C:
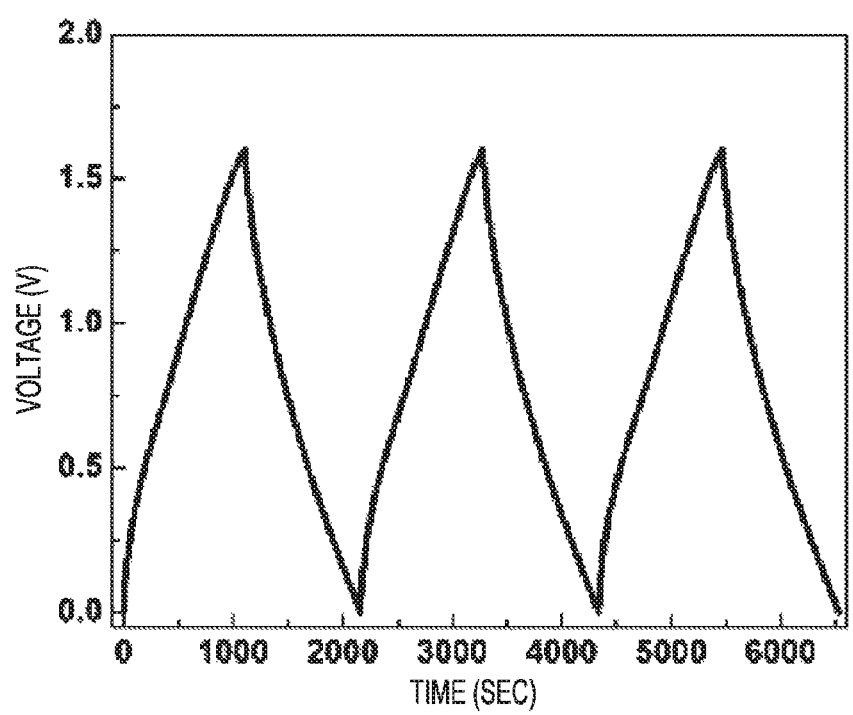
Figure 12A:
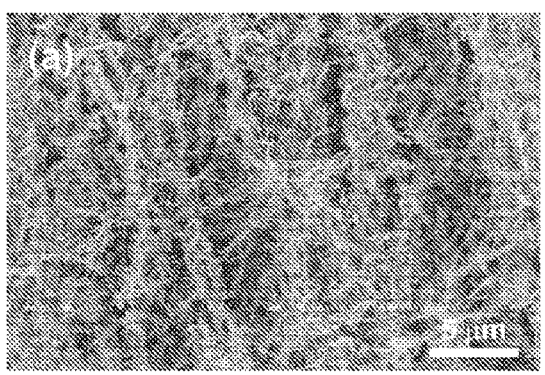
FIG. 12 shows scanning electron microscope images of a surface including metal oxide nanofibers according to an example of the invention.
Figure 12B:
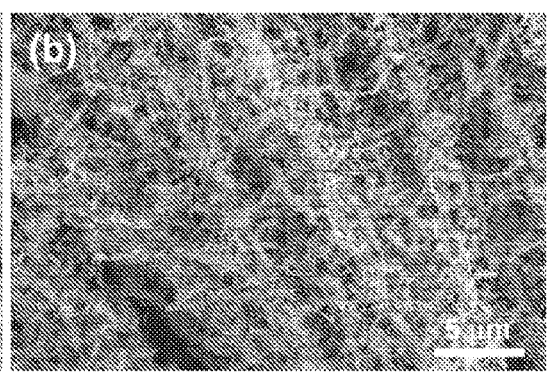
Figure 12C:
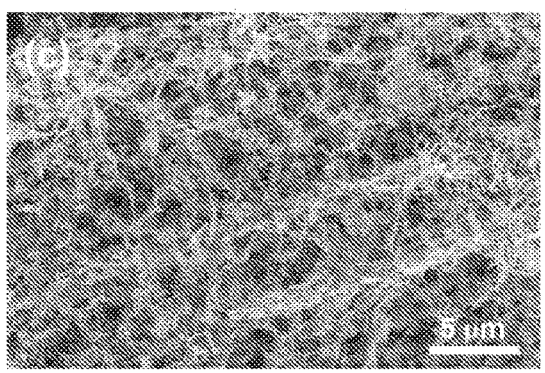
Figure 12D:
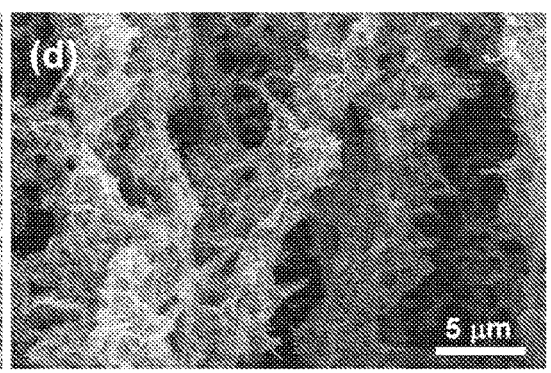
Figure 12E:
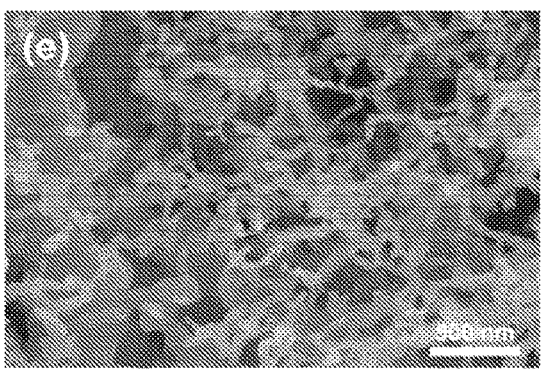
Figure 12F:
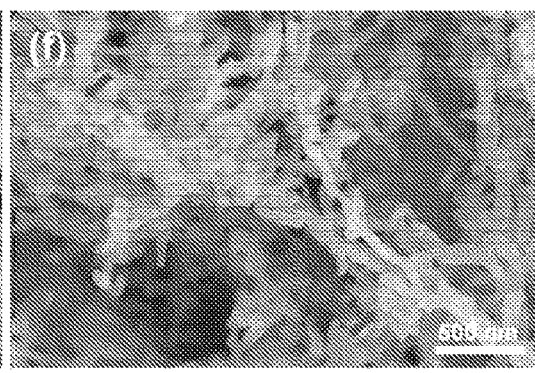
Figure 12G:
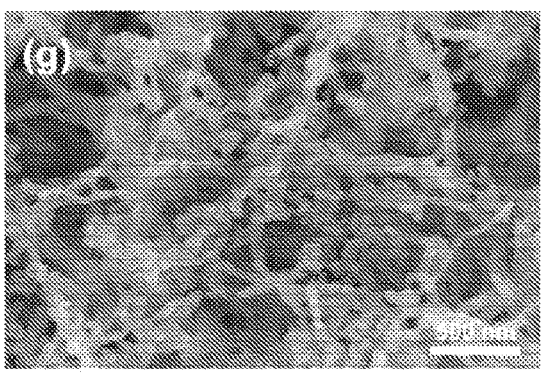
Figure 12H:
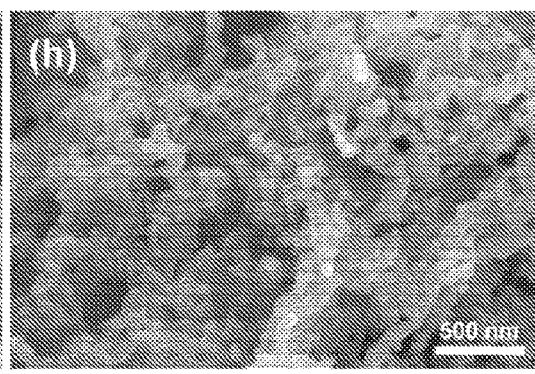
Figure 13A:
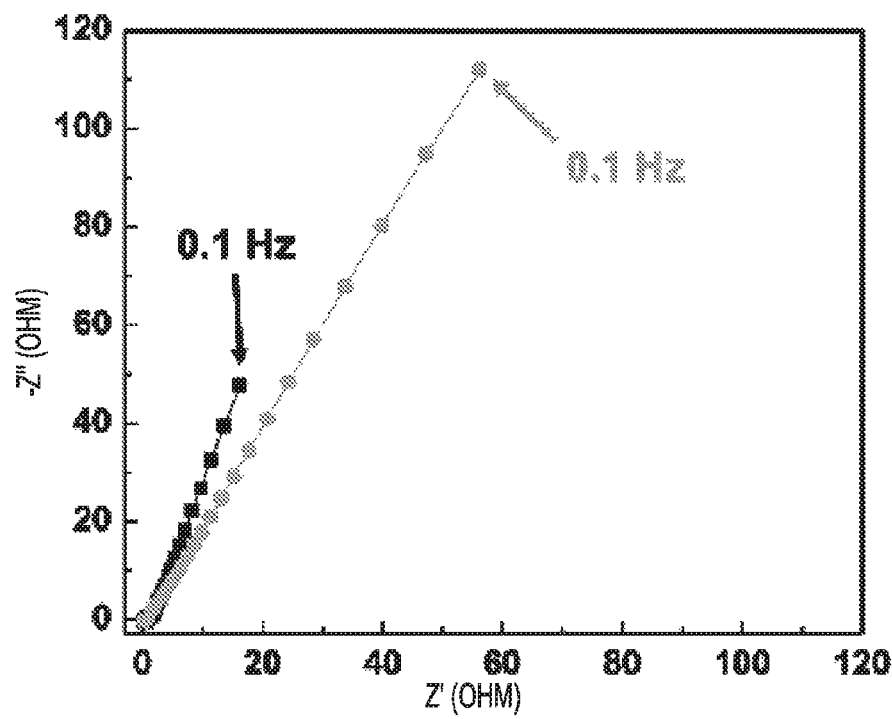
FIG. 13 shows electrochemical impedance spectroscopy data of a capacitor including metal oxide nanofibers according to an example of the invention.
Figure 13B:
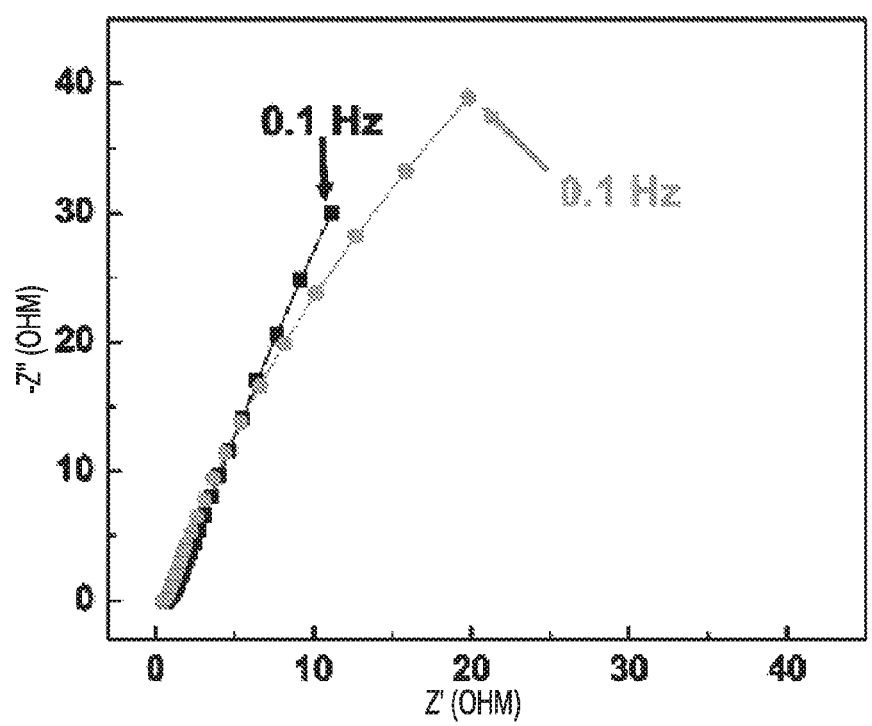
Figure 13C:
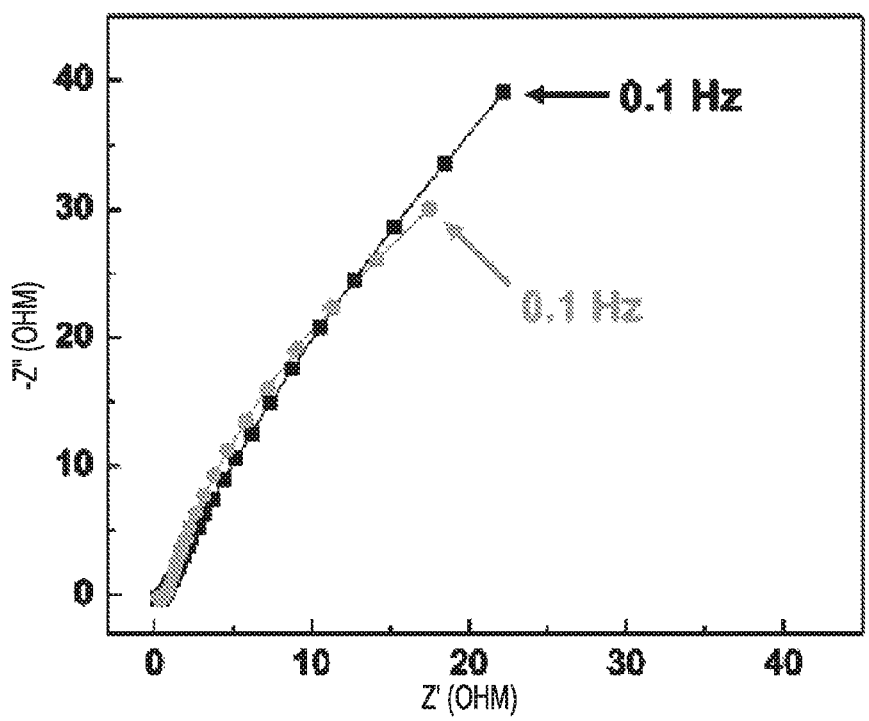
Figure 13D:
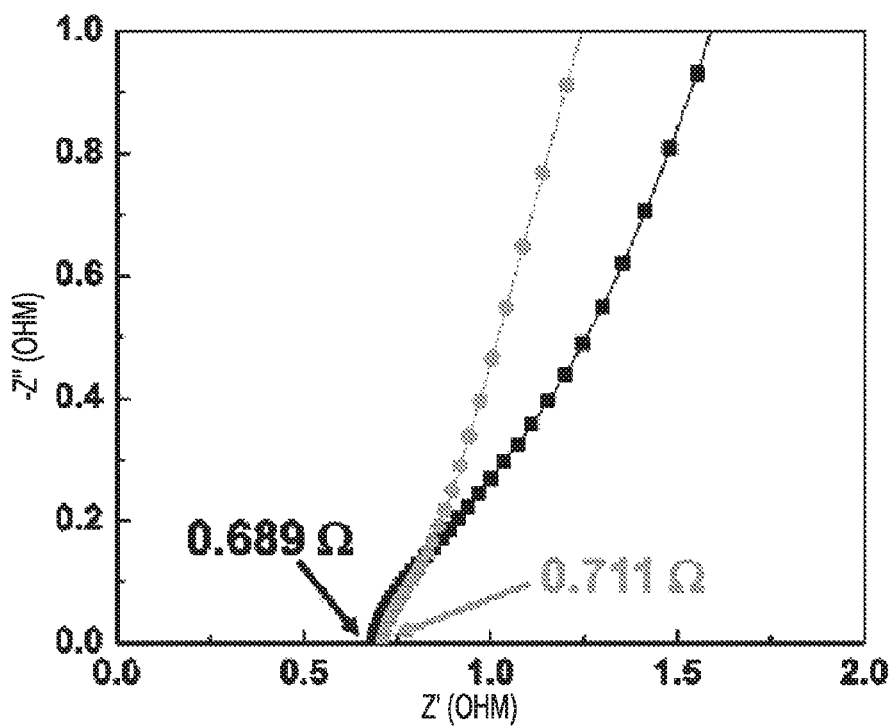
Figure 13E:
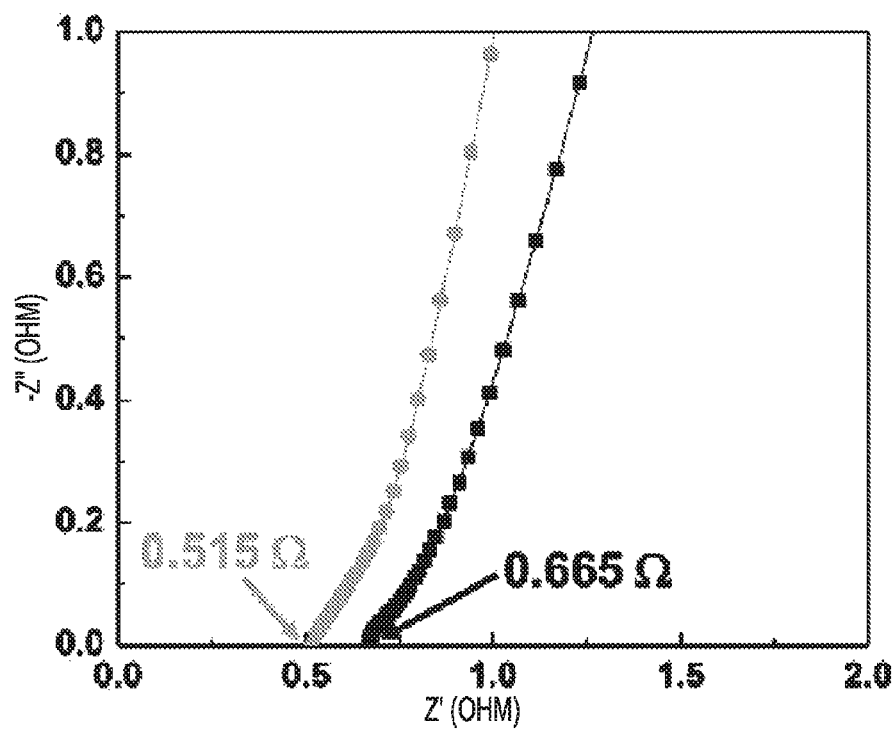
Figure 13F:
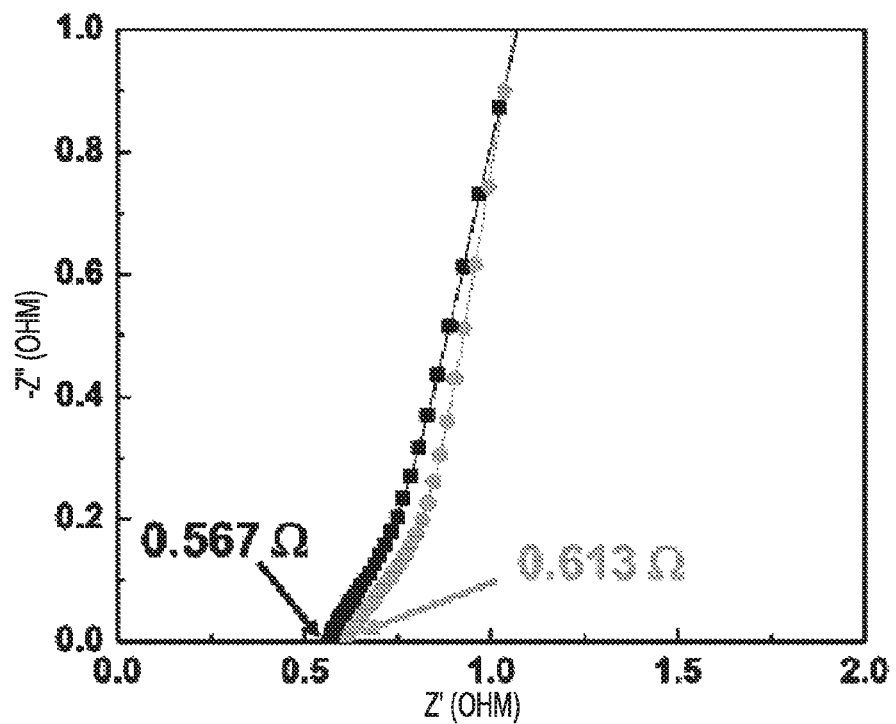
Figure 14A:
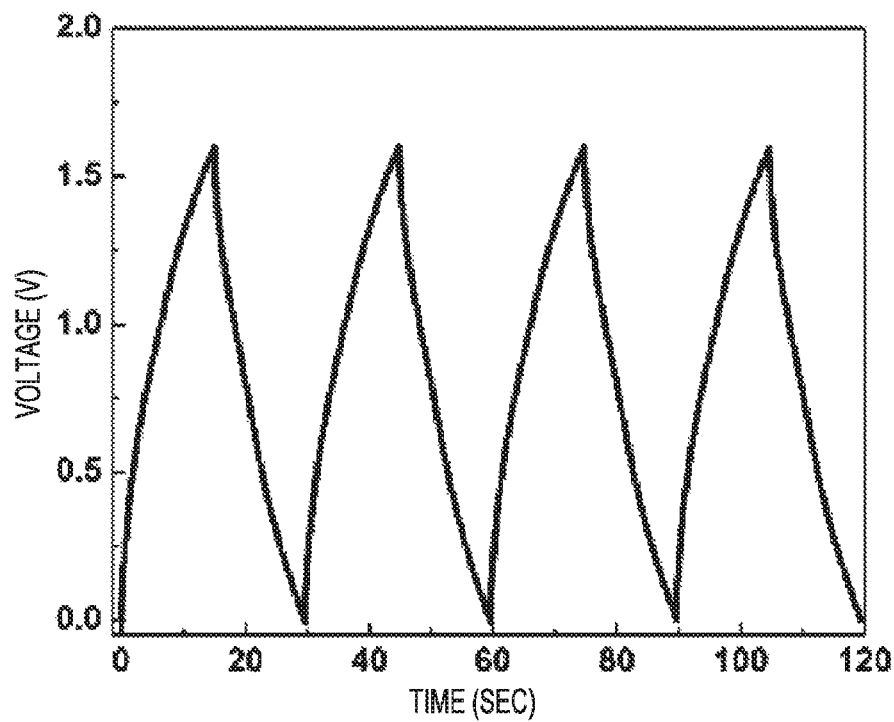
FIG. 14 shows galvanostatic charge/discharge data of a capacitor including metal oxide nanofibers according to an example of the invention.
Figure 14B:
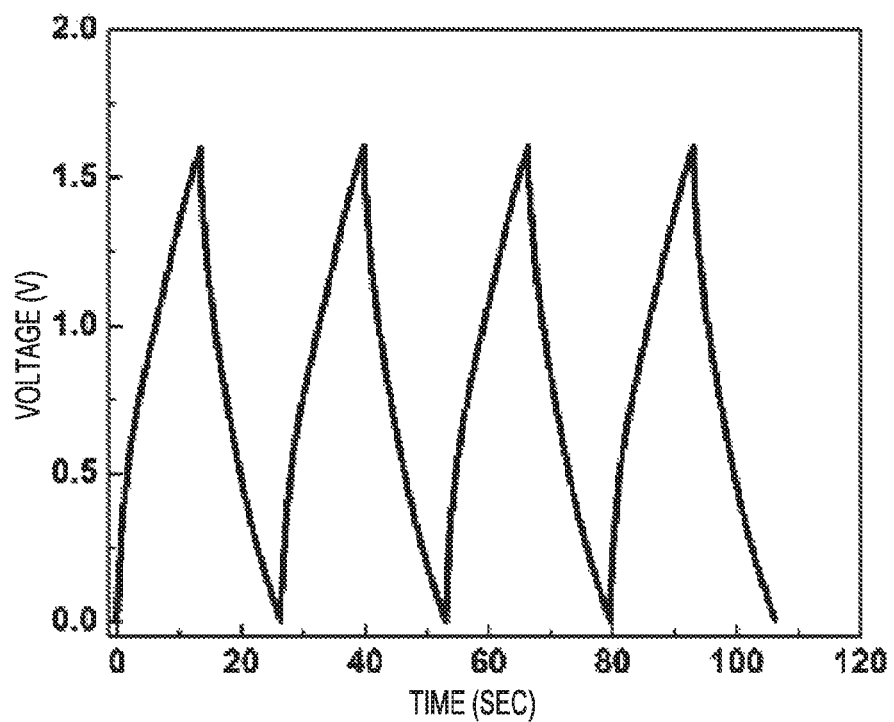
Figure 14C:
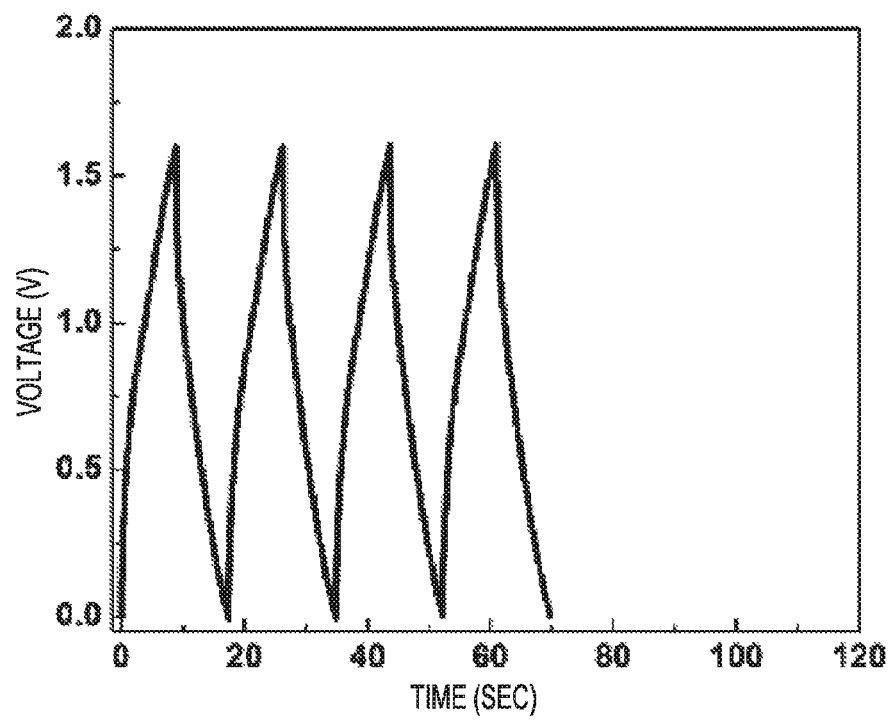
Figure 14D:
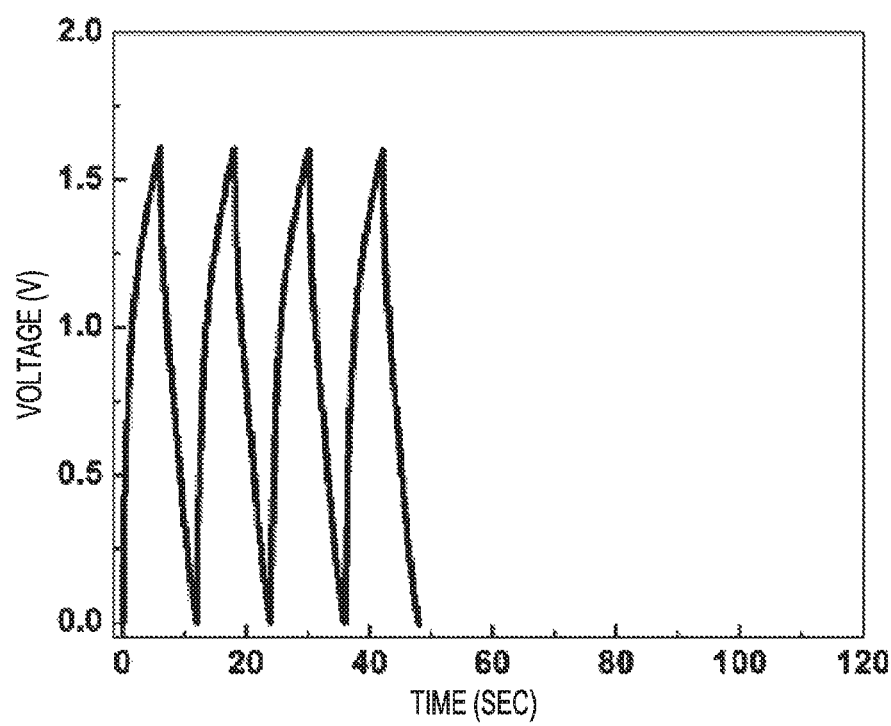
Figure 14E:
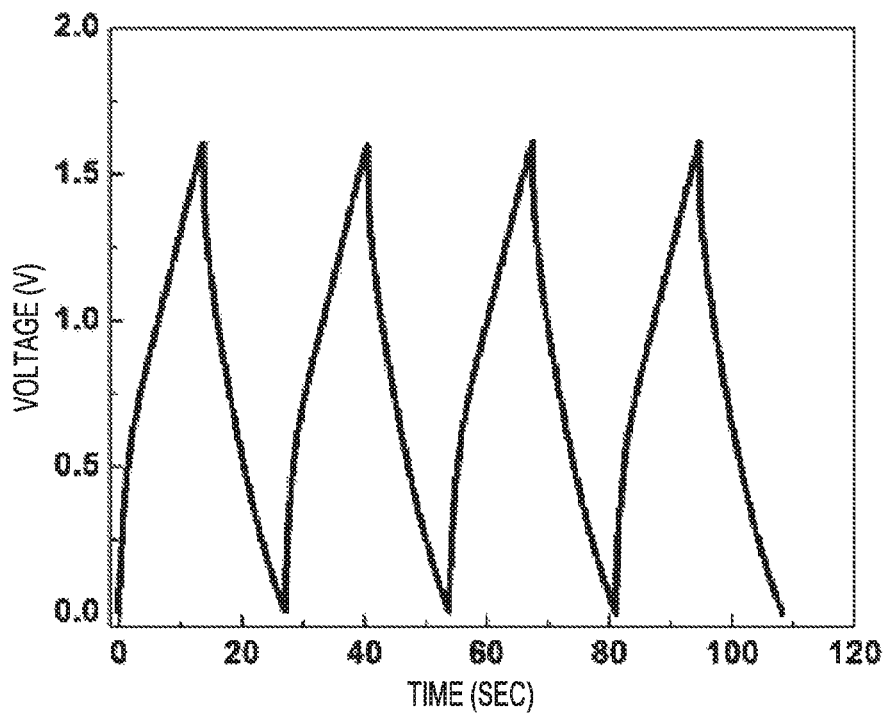
Figure 14F:
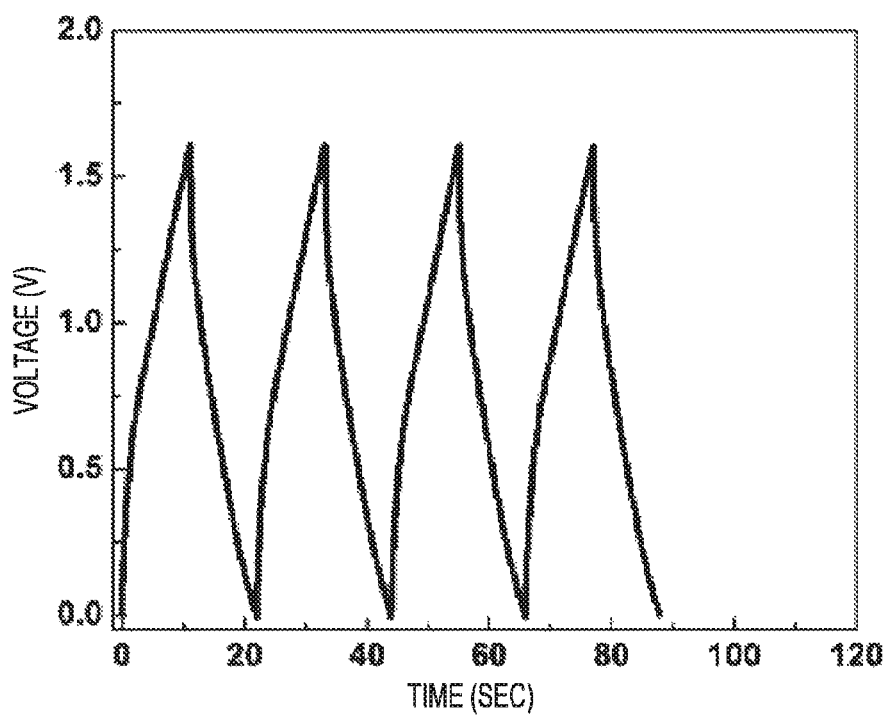

Galvanostatic charge/discharge curves of 0.6 mg cm$^{-2}$ $RuO_2$ with various current density demonstrate nearly linear and symmetric zigzag lines (FIG. 4b), which indicate excellent capacitive behavior of the $RuO_2$-NDF supercapacitor. Specific capacitance (F g$^{-1}$) is calculated with $RuO_2$ loading ranging from 0.3 to 0.9 mg cm$^{-2}$ at different current density (FIG. 4c). At current density 0.5 A g$^{-1}$, specific capacitance as high as 678.57, 664.34 and 525.72 F g$^{-1}$ (0.20, 0.40, 0.47 F cm$^{-2}$) can be obtained for 0.3, 0.6 and 0.9 mg cm$^{-2}$ $RuO_2$, respectively. Even at high current density 100 A g$^{-1}$, specific capacitance of 221.95 F g$^{-1}$ can still be reached by 0.3 mg cm$^{-2}$ $RuO_2$, which suggests Ni NDF can provide fast electronic conduction between active material and current collector, and the open structure facilitates ionic transport between $RuO_2$ and the electrolyte. Specific capacitance of single electrode ($C_s$) is calculated by $C_s=2(i/m)/(\Delta V/\Delta t)$, where i, m, $\Delta V$ and $\Delta t$ are current, mass of $RuO_2$ of one electrode, potential window and discharge time, respectively. Current density is based on $RuO_2$ weight of one electrode. Contribution of specific capacitance from Ni ND can be considered negligible (ca. 3.9 F g$^{-1}$) since it contributes to only 4.8% and 2.4% for 0.3 and 0.6 mg cm$^{-2}$ $RuO_2$, respectively (FIG. 11), Therefore, it is reasonable to consider $RuO_2$ as the only active material. Specific capacitance increases as $RuO_2$ loading decreases from 0.9 to 0.3 mg cm$^{-2}$ because less agglomeration of $RuO_2$ nanoflakes renders more surface area of active material contributing to the pseudocapacitance (FIG. 12). Comparing to the specific capacitances of 0.3 mg cm$^{-2}$, similar values (2.2% to 9.9% drop) are obtained for 0.6 mg cm$^{-2}$, while 23% to 44% drop of capacitance is observed when it is increased to 0.9 mg cm$^{-2}$, which implies that around 0.5 mg cm$^{-2}$ might be the optimal loading for the Ni NDF.

Stability examination is performed on $RuO_2$-NDF of active material 0.3 to 0.9 mg cm$^{-2}$ with 10000 charge-discharge cycles at 20 A g$^{-1}$ (FIG. 4d) since long cycle life is expected for supercapacitors in practical application. After 10000 cycles, the retention diminishes drastically to ca. 40% for 0.3 mg cm$^{-2}$, while for 0.6 and 0.9 mg cm$^{-2}$ the values rise to ca. 104% and 126%, respectively. It is suggested that 0.3 mg cm$^{-2}$ of $RuO_2$ is insufficient to cover the whole surface of Ni NDF (FIGS. 12b and f), which might lead to water decomposition and $O_2/H_2$ gas evolution at high potential, resulting in local pH variation and dissolution of Ni substrates, detachment of weakly-bonded $RuO_2$ from Ni ND and consequently faded capacitance after long cycle. For 0.6 mg cm$^{-2}$, capacitance decline to ca. 88% after 3000 cycles, but gradually rise to 104%, after 10000 cycles. This might result from minute $O_2/H_2$ evolution and Ni dissolution of uncovered Ni ND surface (FIGS. 12c and g) inducing small amount of unstable $RuO_2$ removal in the beginning, but reduced agglomeration of $RuO_2$ nanoflakes gradually improve the capacitance. For 0.9 mg cm$^{-2}$, the surface is well covered with relatively thick $RuO_2$ layer (FIGS. 12d and h), and more and more active surface is exposed to electrolyte during the cycling process. Accordingly, 0.6 mg cm$^{-2}$ might be the appropriate loading amount on the Ni NDF considering the cycling stability. High Coulombic efficiencies, define as the percentage of discharge time over charge time, ranging from 97 to 101% are achieved on all loading of $RuO_2$, which indicates they are highly efficient during charge and discharge process.

Figure 5A:
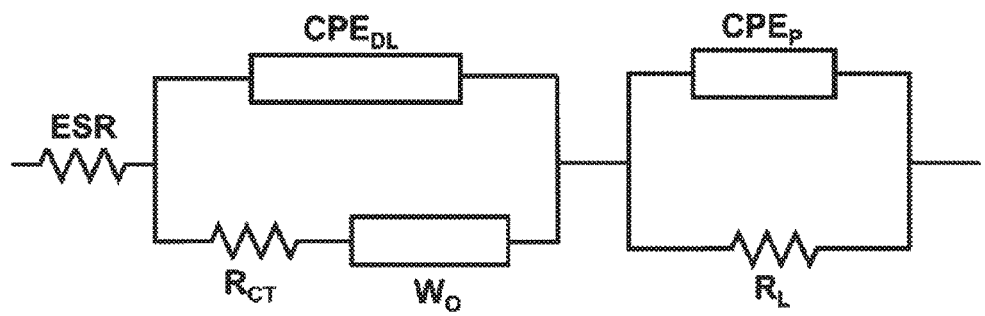
FIG. 5 shows electrochemical impedance spectroscopy data of a capacitor including metal oxide nanofibers according to an example of the invention.
Figure 5B:
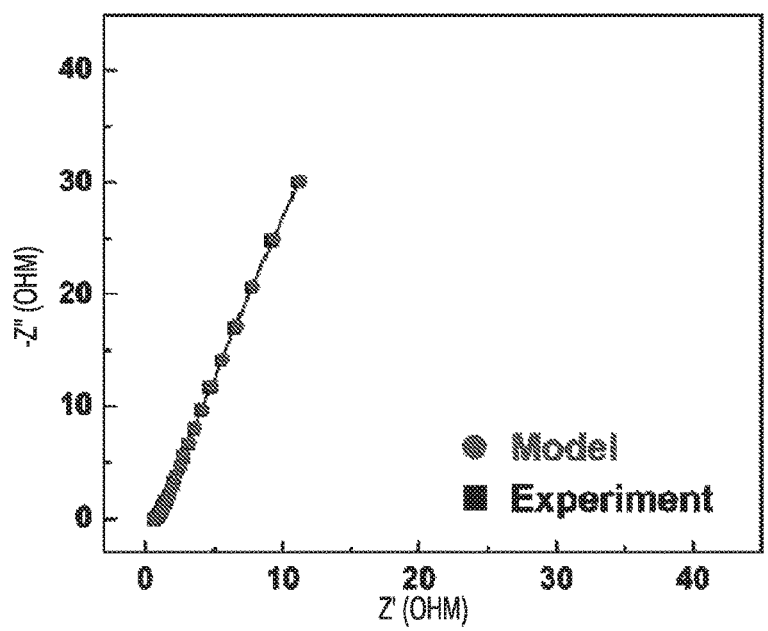
Figure 5C:
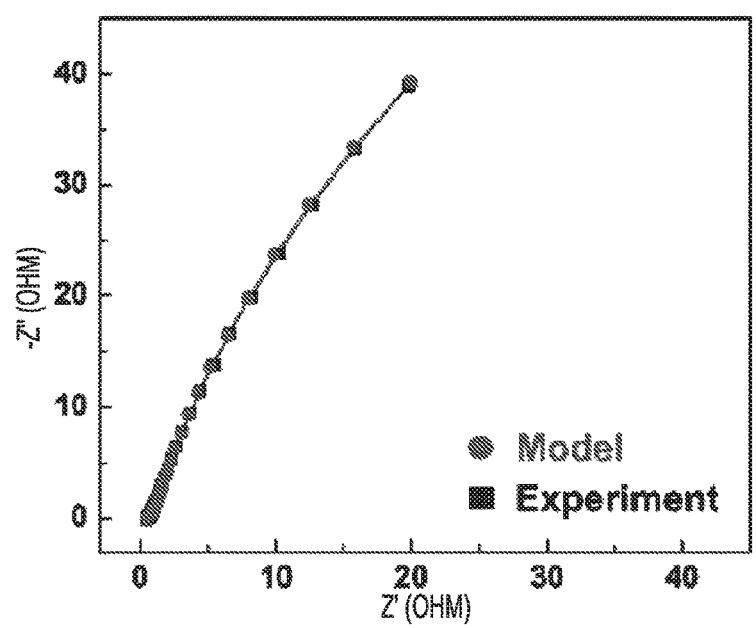
Figure 5D:
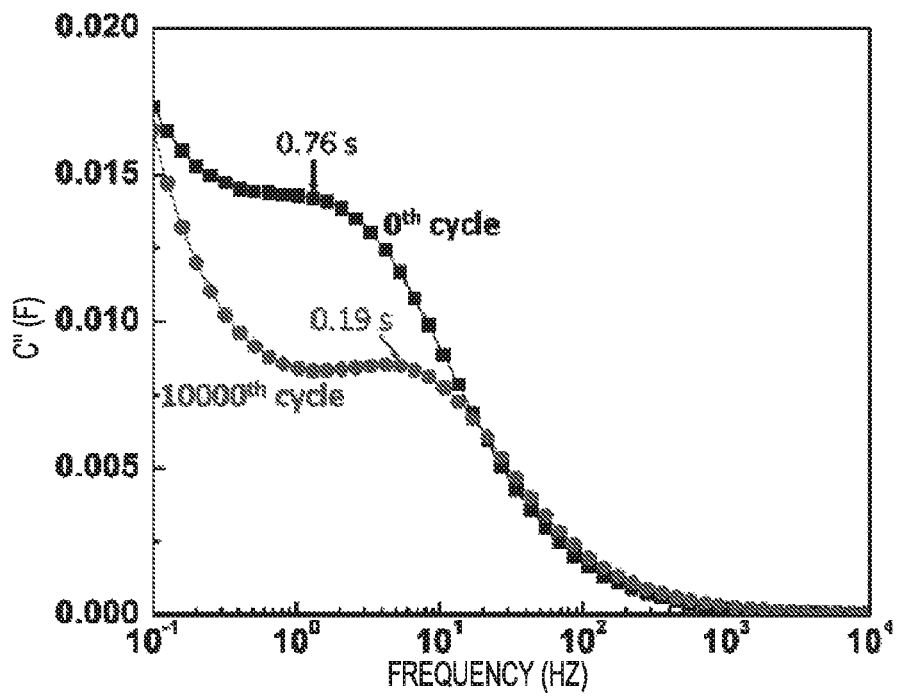
Figure 5E:
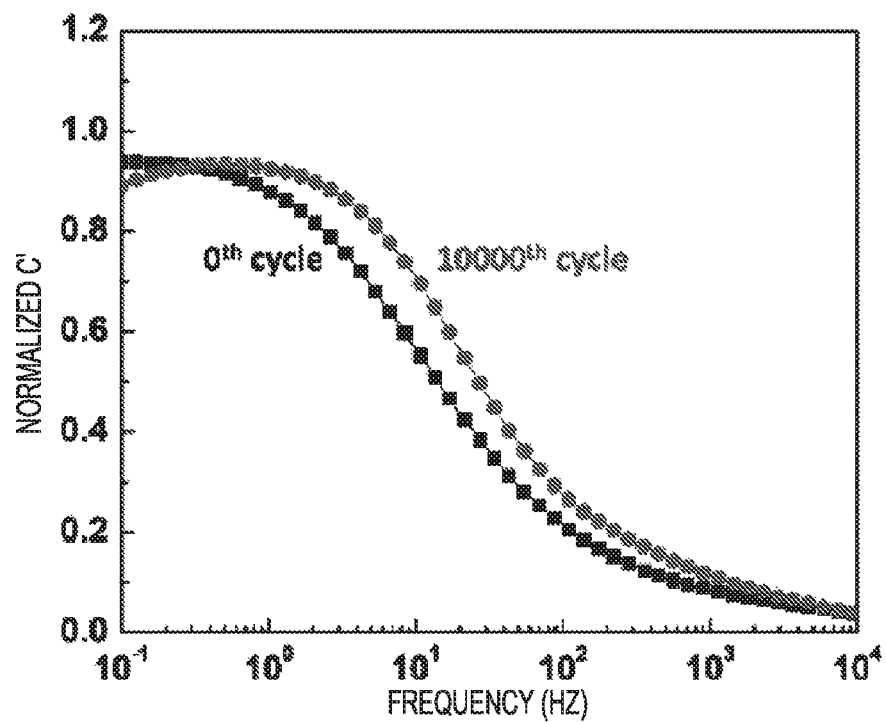
Figures 6, 7:
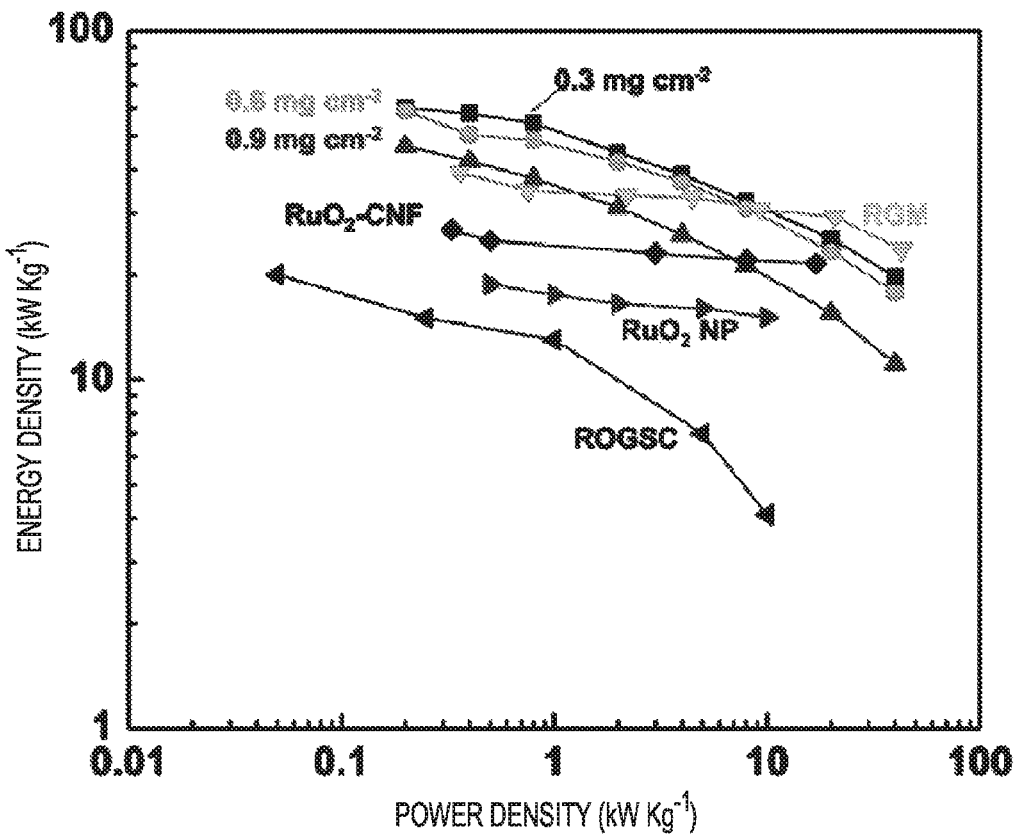
FIG. 6 shows energy density data of a capacitor including metal oxide nanofibers according to an example of the invention.
FIG. 7 shows electrochemical impedance spectroscopy curve fitting parameters of a capacitor including metal oxide nanofibers according to an example of the invention.
Figure 8F:
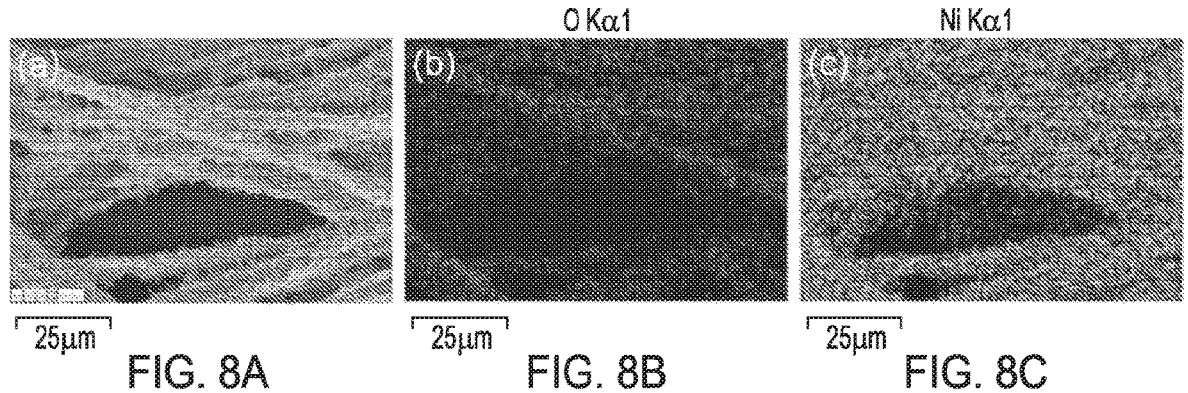
FIG. 8 shows elemental dispersive spectroscopy mapping data for a capacitor electrode including metal oxide nanofibers according to an example of the invention.
Figure 8F:
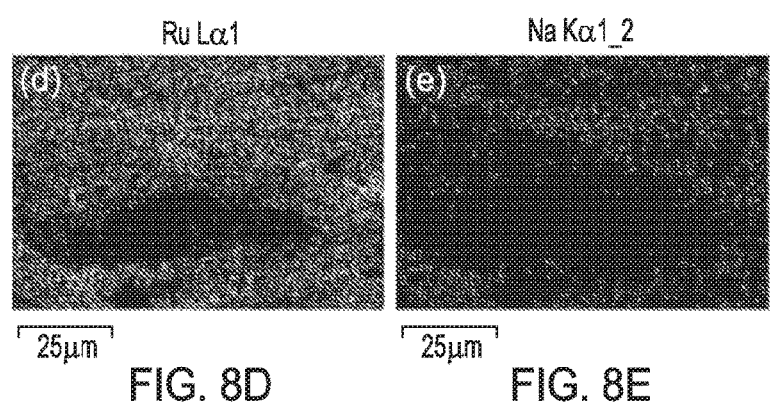
Figure 8F:
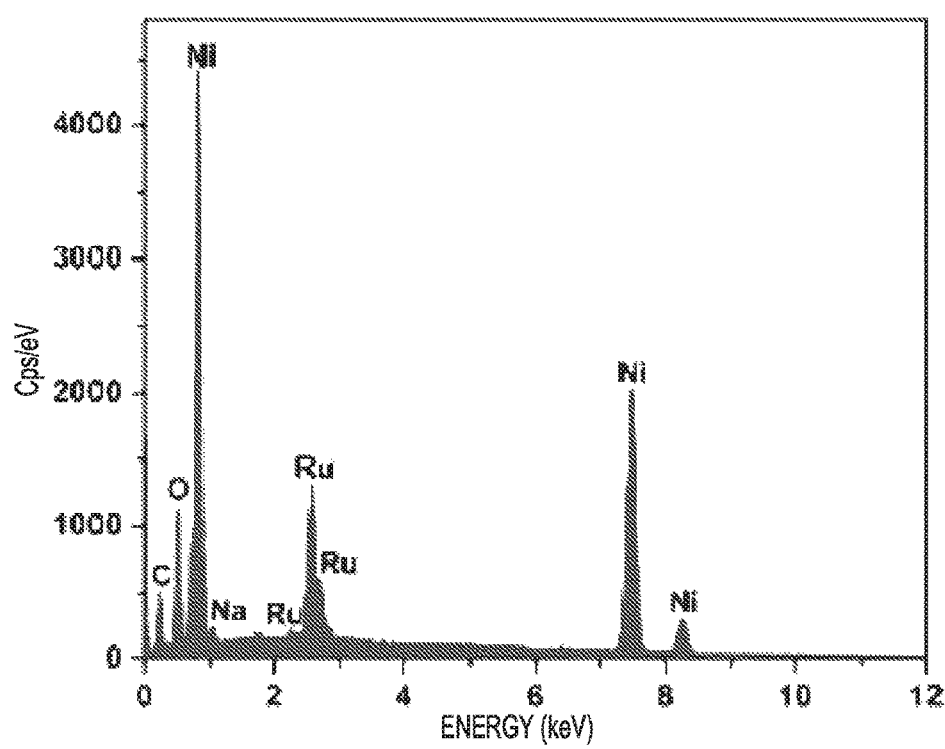
Figures 8G, 8H, 8I:
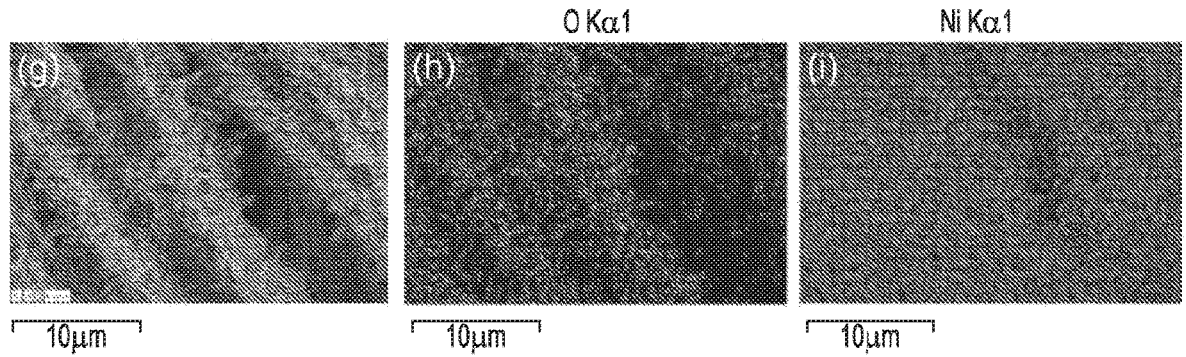
Figures 8J, 8K, 8L:
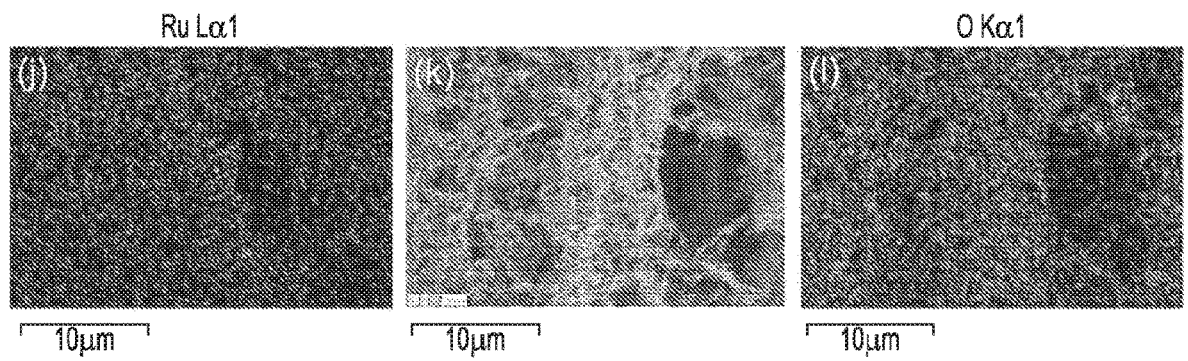
Figures 8M, 8N:
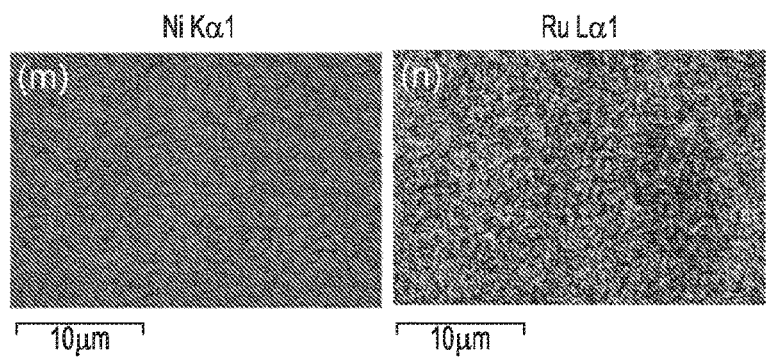

Electrochemical impedance spectroscopy (EIS) is used to discover additional information regarding the $RuO_2$-NDF supercapacitor of 0.6 mg cm$^{-2}$ $RuO_2$ (FIG. 5) with complex impedance plots before and after 10000 cycles. The equivalent circuit model and fitting parameters are shown in FIG. 5a and FIG. 7, respectively. Equivalent series resistance (ESR) quantifies the resistances of electrolyte, current collectors and electrode materials. ESR diminution from 0.665 to 0.515Ω (Table 1) after cycling might result from gradual activation of agglomerated materials, and the low ESR values indicate superior power capability. Charge transfer resistance ($R_{CT}$) is related to the overpotential at the electrode-electrolyte interface during both cathodic and anodic electron transfer. $R_{CT}$ holds steady after cycling, which provides evidence for excellent stability of the electrode. Leakage resistance ($R_L$) represents irreversible capacity loss. $R_L$ before and after cycling are still significantly high (300 and 120Ω respectively), indicating that current drawn to irreversible processes is negligible. Constant phase elements (CPEs) have been used to model distributed nature of capacitance in a spatially non-uniform electrochemical system. $CPE_{DL}$ and $CPE_P$ are the non-uniform capacitances due to double layer formation and pseudocapacitive $RuO_2$ species, respectively. $CPE_P$ decrease induced by degradation of active materials is compensated by $CPE_{DL}$ improvement as a result of enlarged surface area due to reduced aggregation of $RuO_2$ nanoflakes, which results in ca. 4% enhancement (FIG. 4d) in total capacitance after 10000 cycles. A Warburg element ($W_O$) is utilized to model electrolyte diffusion within the porous-like electrode. Short Warburg region in the intermediate frequency range (FIGS. 5b and c) and insensitivity of Warburg, parameters before and after cycling (FIG. 7) indicate no vigorous variation in ion diffusion path lengths of the electrodes is observed.

Stability of the $RuO_2$-coated Ni NDF electrodes is further discussed by comparing the EIS spectrum (FIG. 13) and charge/discharge curves before and after 10000 cycles (FIG. 14). Before long cycles, the EIS Nyquist plots of the three different loadings in the low frequency region show linear and vertical-like characteristics indicating ideal capacitive behaviors. After 10000 cycles, these characteristics are essentially remained with some deviations from ideality resulting from frequency dispersion of wider pore size distribution of the porous electrodes after long cycles. ESR of the three different $RuO_2$ loadings exhibit low resistance changes (0.3 mg cm$^{-2}$:0.689 to 0.711 Ω; 0.6 mg cm$^2$:0.665 to 0.515 Ω; 0.9 mg cm$^{-2}$:0.567 to 0.613Ω). The stable ESR values indicate no severe modifications of the structure of current collector, the composition of electrolyte and electrode materials since ESR accounts for the resistances of electrolyte, current collector and electrode materials. These evidences demonstrate that serious water decomposition and Ni ND dissolution resulting in enormous electrolyte composition modification, electrode material corrosion, and structural demolition do not occur in the $RuO_2$-NDF electrode. Capacitive behaviors of the three $RuO_2$ loadings before and after 10000 cycles are manifested by the symmetric charge/discharge curves (FIG. 14), which show no plateaus at high potentials, indicating water decomposition or Ni dissolution are not the dominant reactions regardless of the capacitance changes after 10000 cycles. Average Coulombic efficiency (FIG. 4d) of 0.3, 0.6 and 0.9 mg cm$^{-2}$ are 99.26%, 99.72% and 99.86%, respectively, which show almost all charges supplied during recharge steps can be delivered back during the discharge steps. These again demonstrate the irreversible reactions, such as gas evolution or Ni dissolution, resulting in low Coulombic efficiency are not the dominant reactions. The slightly lower Coulombic efficiency of 0.3 mg cm$^{-2}$ corresponds to minute gas evolution or Ni dissolution, leading to loss of active materials and capacity fading. Stabilities of Ni current collectors operated in aqueous sulfate electrolytes and high potentials have been shown in several literatures. In 0.5 M $Na_2SO_4$ aqueous solution, Ni mesh is stable in −1.0 to 1.2 V vs. saturated calomel electrode, and 10000 cycles with slight capacitance loss (<3%) is achieved using asymmetric activated carbon//$NaMnO_2$ assembly between 0 and 1.9 V. Asymmetric supercapacitors consisting of graphite oxide//CuO@$MnO_2$ on Ni foils are cycled in 0-1.8 V for 10000 times with 101.5% capacitance retention in 1 M $Na_2SO_4$ aqueous electrolyte. Ru films deposited on Ni foam by chemical replacement reaction as both negative and positive electrodes in symmetric supercapacitors are operated for 2000 cycles in 1 M $Na_2SO_4$ without significant capacitance loss in the potential window 0-1.8 V. Accordingly, Ni can be stably cycled in high potentials with sulfate aqueous electrolytes as current collectors for both negative and positive electrodes.

Complex capacitance analysis is performed on 0.6 mg cm$^{-2}$ $RuO_2$-NDF supercapacitor (FIGS. 5d and e) by considering it as a whole capacitor with impedance $Z(w)=[jwC(w)]^{-1}$, where w and C(w) are angular frequency and complex capacitance, respectively. The impedance data are obtained directly from EIS measurement. If Z(w) can be expressed as real part Z'(w) and imaginary part Z"(w), complex capacitance can be separated into real part C'(w) and imaginary part C"(w). C'(w) represents available stored energy and C"(w) is responsible for energy loss during charge storage, where $C'(w)=-Z''(w)/[w|Z(w)|^2]$ and $C''(w)=Z'(w)/[w|Z(w)|^2]$. Frequency $f_0$ at local maximum of C"(w) specifies dielectric relaxation time constant $\tau_0=1/f_0$. Capacitors possess predominately capacitive and resistive behaviors when the frequency is lower and higher than $f_0$, respectively. $RuO_2$-NDF supercapacitor shows higher frequency (5.3 Hz) after 10000 cycles comparing to the 1.3 Hz before cycling, which means the device can be operated in a wider frequency domain and deliver energy faster (from 0.76 s to 0.19 s) after cycling. This agrees with smaller ESR (from 0.665Ω to 0.516Ω) after cycling, since higher power can be delivered with lower ESR in a shorter period. Broader operating frequency range after cycling is also demonstrated in normalized C' (FIG. 5e). These measurements suggest the $RuO_2$-NDF supercapacitor can maintain and even slowly improve its performance after long cycles.

Performance of the $RuO_2$-NDF supercapacitors are compared with other two-electrode symmetric supercapacitors by energy density (Wh kg$^{-1}$) and power density (kW kg$^{-1}$) in a Ragone plot (FIG. 6). Both energy density and power density are based on the total weight of $RuO_2$ on two electrodes. For 0.3 mg cm$^{-2}$, energy density 60.32 Wh kg$^{-1}$ can be obtained at 0.2 kW kg$^{-1}$, while it decreases to 19.73 Wh kg$^{-1}$ when power density increases to 40 kW kg$^{-1}$. These values are close to those of 0.6 mg cm$^{-2}$ (59.05 Wh kg$^{-1}$ at 0.2 kW kg$^{-1}$, 17.78 Wh kg$^{-1}$ at 40 kW kg$^{-1}$). Energy and power density decrease dramatically for 0.9 mg cm$^{-2}$ (46.73 Wh kg$^{-1}$ at 0.2 kW kg$^{-1}$, 11.11 Wh kg$^{-1}$ at 40 kW kg$^{-1}$) resulting from inefficient utilization of large $RuO_2$ loading. However, the performance of these $RuO_2$-NDF supercapacitors are still close to or even better than most $RuO_2$ composite supercapacitors. Although $RuO_2$ on graphene/CNT foam (RGM) behaves slightly better when power density is beyond 20 kW kg$^{-1}$, high vacuum environment for catalyst deposition and high temperature growth of graphene/CNT foam render RGM impractical for real products. Considering the liquid-based, low temperature, and environmentally friendly process, $RuO_2$-NDF electrodes are relatively facile, inexpensive and suitable for large scale production.

In conclusion, Ni NDF has been demonstrated as an effective current collector for $RuO_2$ nanoparticles. High specific capacitance, high energy and power density, and superior cycling stability over 10000 cycles can be achieved with $RuO_2$-NDF electrodes. Facile manufacturing processes, including liquid base, low temperature and environmentally benignity, lead to the possibility of mass production of this novel electrode.

Experimental Section

Materials synthesis: Ni foam (MTI Corp., EQ-benf-16m) with 15 mm diameter was first flattened to thickness ca. 120 μm, and etched in concentrated HCl (EMD, GRACS, 37%) for 5 min to remove native oxide and increase nucleation cites for Ni nanowire growth. After etching, Ni foam was washed with deionized water for 15 times, and dried on hotplate at 100° C. for 5 min. Average weight loss after HCl etching is ca. 5 mg. HCl-etched Ni foam was immersed in a 10 ml beaker filled with a solution of 2.5 ml 0.08 M nickel acetate tetrahydrate (Ni(Ac)$_2$.4H$_2$O, Sigma-Aldrich, 98%) in glycerol (Acros, 99+ %) heated at 370° C. on a hotplate for 20-40 min without stirring and covered with Al foil to prevent excess solvent evaporation. After growth, Ni nanowires attached on Ni foam were washed with deionized water for 15 times, and dried on hotplate at 120° C. for 5 min. Magnetic field was provided from the magnetic stir rotor inside the hotplate. Ni nanowire weight is ca. 5.5 mg. Freshly prepared 4 ml solution of 0.3 M oxalic acid dihydrate (ICN Biomedicals Inc., reagent grade) in ethanol (Decon Lab. Inc., 200 proof) with 5 wt % deionized water was used to etch Ni nanowire at 120° C. for 2 h on hotplate into Ni oxalate leaf-like nanostructure, which was further reduced back to Ni nanodendrite in a tube furnace with $H_2$ (50 sccm), Ar (100 sccm) at 20 torr for 10 min at 350° C. with ramping rate 32.5° C. min$^{-1}$. Hydrous $RuO_2$ was prepared with a modified sol-gel method with the reaction $RuCl_3+3NaOH=Ru(OH)_3+3NaCl$. 0.8 ml 1 M NaOH (Fisher Scientific, Certified A.C.S.) aqueous solution was dripped dropwise (10 μl per drop) into a 2.3 ml 0.1 M ruthenium chloride hydrate ($RuCl_3.xH_2O$, Sigma-Aldrich, ReagentPlus) aqueous solution to reach pH=7 and stirred for 10 min. The mixed solution was centrifuged and washed with deionized water 8 times, and 3.6 ml water was added to make the $RuO_2$ solution concentration ca. 4 mg ml$^{-1}$. $RuO_2$ solution was dropped onto Ni nanodendrite foam ($RuO_2$-NDF) and dried at room temperature several times until the desired loading was reached. $RuO_2$-NDF composite was annealed at 150° C. for 2 h under vacuum before electrochemical measurement.

Materials characterization: Surface microstructure and elemental analysis were characterized by scanning electron microscopy (SEM, FEI NovaNanoSEM 450) with energy dispersive X-ray spectroscopic (EDX) detector. Crystalline phase was determined by X-ray diffraction (XRD, PANalytical Empyrean) with Cu-Kα radiation and scan rate 3.5° min$^{-1}$. Nanostructure and crystalline phase were investigated by transmission electron microscopy (TEM, Philips FEI CM300) operated at 300 kV with selected area electron diffraction. TEM samples were prepared by dripping $RuO_2$ nanoparticles dispersed in ethanol onto C film coated TEM grid. Chemical states of $RuO_2$ were examined by X-ray photoelectron spectroscopy (XPS, Kratos AXIS ULTRA DLD XPS system) with Al Kr☐ monochromated X-ray source and 165-mm mean radius electron energy hemispherical analyzer.

Electrochemical characterization: Two-electrode symmetric supercapacitors were prepared with two pieces of $RuO_2$-NDF circular electrodes (dia. 15 mm) separated by two pieces of Celgard 3501 porous membrane (dia. 19 mm) inside a split cell (MTI Corp.) filled with 2M $Li_2SO_4$ (≥98.5%, Sigma-Aldrich) aqueous electrolyte. Cyclic voltammetry (CV), galvanostatic charge/discharge and electrochemical impedance spectroscopy (EIS) at $E_{we}$=0 V vs. open circuit voltage between 0.1 to 1 MHz with amplitude 10 mV were performed. Total capacitance ($C_t$) of the two-electrode capacitor is calculated by $C_t$=i/($\Delta V/\Delta t$), where i, $\Delta V$ and $\Delta t$ are current, potential window and discharge time, respectively. Since the two electrodes are in series, $1/C_t=1/C_o+1/C_o$, where $C_o$ is the capacitance of single electrode assuming the capacitance of one electrode is very close to the other. Accordingly, $C_o=2C_t=2i/(\Delta V/\Delta t)$. Specific capacitance of single electrode ($C_s$) is $C_s=C_o/m$ where m is the mass of $RuO_2$ of one electrode. Total energy $E=(1/2)C_t\Delta V)^2$. Total power $P=E/\Delta t$. Both energy density (E/2m) and power density (P/2m) are based the total weight of $RuO_2$ of the two electrodes.

Figure 15:
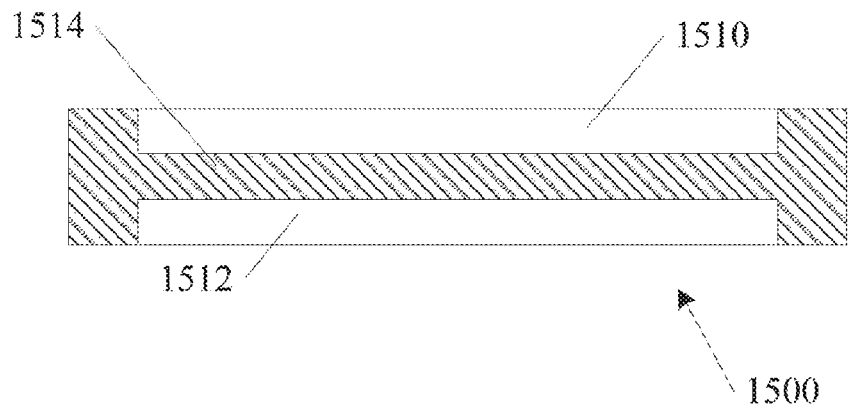
FIG. 15 shows a capacitor including metal oxide nanofibers according to an example of the invention.

FIG. 15 shows an example of a capacitor 1500 according to an embodiment of the invention. The capacitor 1500 is shown including a first electrode 1510 and second electrode 1512. A dielectric 1514 is shown between the first electrode 1510 and the second electrode 1512. In one example, the capacitor 1500 is a supercapacitor. In one example, the first electrode 1510 is formed from a material including ruthenium oxide coated branched fibers as described in examples above.

Figure 16:
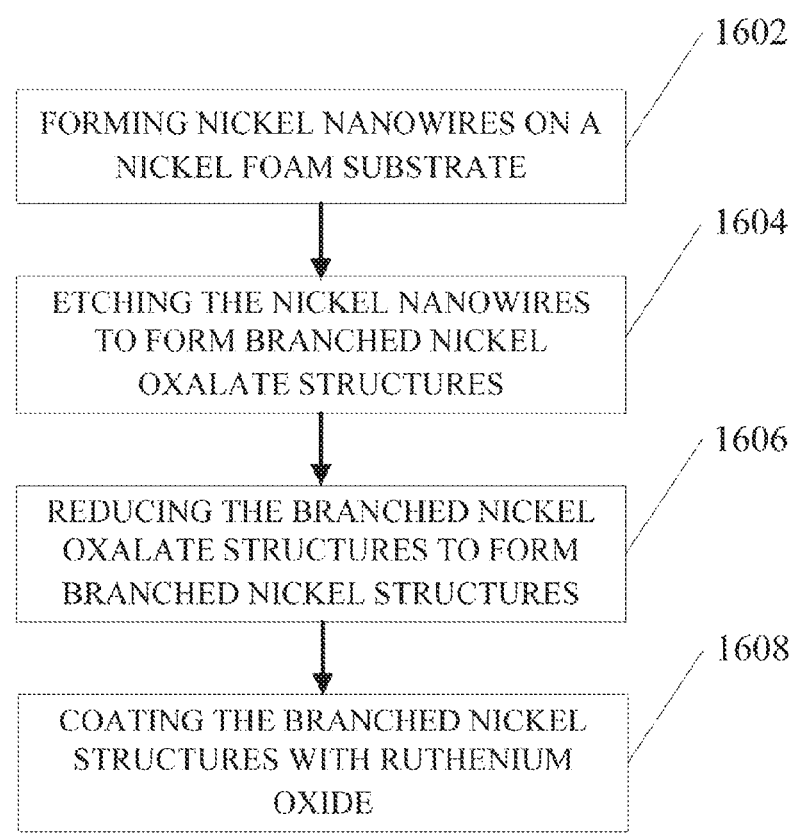
FIG. 16 shows a method of forming a material including metal oxide nanofibers according to an example of the invention.

FIG. 16 shows an example method of forming according to an embodiment of the invention. In operation 1602, nickel nanowires are formed on a nickel foam substrate. In operation 1604, the nickel nanowires are etched to form branched nickel oxalate structures. In operation 1606, the branched nickel oxalate structures are reduced to form branched nickel structures, and in operation 1608, the branched nickel structures are coated with ruthenium oxide.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. An electrode, comprising:
    a mat of branched metal nanofibers on a nickel foam substrate; and
    a ruthenium oxide coating on an outer surface of the branched metal nanofibers.

2. The electrode of claim 1; wherein the mat of branched metal nanofibers include branched nickel nanofibers.

3. The electrode of claim 1, wherein the ruthenium oxide coating includes hydrous ruthenium dioxide.

4. The electrode of claim 1, wherein the electrode is one of a pair of electrodes in a capacitor.

5. The electrode of claim 4, wherein the capacitor includes a pair of the electrodes of claim 1 separated by a dielectric.

6. A method of forming an electrode, comprising
    forming nickel nanowires on a nickel foam substrate;
    etching the nickel nanowires to form branched nickel oxalate structures;
    reducing the branched nickel oxalate structures to form branched nickel structures; and
    coating the branched nickel structures with ruthenium oxide.

7. The method of claim 6, wherein etching the nickel nanowires inductees etching in oxalic acid at a temperature of approximately 120° C.

8. The method of claim 6, wherein reducing the branched nickel oxalate structures includes reducing in a hydrogen atmosphere.

9. The method of claim 6, further including coupling the electrode adjacent to a second electrode to form a capacitor.

* * * * *